(12) United States Patent
Gao et al.

(10) Patent No.: US 11,356,372 B2
(45) Date of Patent: Jun. 7, 2022

(54) DATA TRAFFIC PROCESSING METHOD, DEVICE, AND SYSTEM

(71) Applicant: Huawei Technologies Co., Ltd., Shenzhen (CN)

(72) Inventors: Yuan Gao, Nanjing (CN); Wenhui Li, Nanjing (CN); Yongkang Zhang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 50 days.

(21) Appl. No.: 17/027,476

(22) Filed: Sep. 21, 2020

(65) Prior Publication Data
US 2021/0014166 A1 Jan. 14, 2021

Related U.S. Application Data

(63) Continuation of application No. PCT/CN2018/117989, filed on Nov. 28, 2018.

(30) Foreign Application Priority Data

Mar. 22, 2018 (CN) .......................... 201810241895.6

(51) Int. Cl.
*H04L 12/803* (2013.01)
*H04L 47/125* (2022.01)
(Continued)

(52) U.S. Cl.
CPC ........ *H04L 47/125* (2013.01); *H04L 12/4633* (2013.01); *H04L 12/4641* (2013.01);
(Continued)

(58) Field of Classification Search
CPC ..... H04L 47/34; H04L 12/46; H04L 12/4633; H04L 12/4641; H04L 29/06;
(Continued)

(56) References Cited

U.S. PATENT DOCUMENTS 9,569,301 B2 * 2/2017 Jain ..................... H04L 12/4633
9,571,362 B2 * 2/2017 Jain ..................... H04L 12/4641
(Continued)

FOREIGN PATENT DOCUMENTS

CN 101459615 A 6/2009
CN 101917472 A 12/2010
(Continued)

*Primary Examiner* — Wutchung Chu
(74) *Attorney, Agent, or Firm* — Slater Matsil, LLP

(57) ABSTRACT

This application provides a data traffic processing method, a device, and a system. The method includes: receiving, by a first network device on a first link, a first VXLAN packet sent by a second network device, where the first VXLAN packet includes a first sequence number and a first service packet; decapsulating, by the first network device, the first VXLAN packet; receiving, by the first network device on a second link, a second VXLAN packet sent by the second network device, where the second VXLAN packet includes a second sequence number and a second service packet; and when the first network device determines that the second sequence number is a next sequence number of the first sequence number, decapsulating, by the first network device, the second VXLAN packet.

16 Claims, 7 Drawing Sheets

(51) Int. Cl.
*H04L 12/46* (2006.01)
*H04L 47/34* (2022.01)
*H04L 69/22* (2022.01)

(52) U.S. Cl.
CPC .............. *H04L 47/34* (2013.01); *H04L 69/22* (2013.01); *H04L 2212/00* (2013.01)

(58) Field of Classification Search
CPC ... H04L 47/125; H04L 69/22; H04L 2212/00; H04L 43/0811; H04L 43/00; H04L 45/745; H04L 1/1621; H04L 49/253; H04L 43/06; H04L 45/24; H04L 43/10; H04L 63/164; H04L 67/28; H04L 43/026; H04L 65/1006; H04L 63/061; H04L 45/38; H04L 12/1403; H04L 49/354; H04L 41/5038; H04L 41/5009; H04L 47/50; H04L 45/74; H04L 45/02; H04L 61/103; H04L 45/16; H04L 45/50; H04L 45/586; H04L 45/64; H04L 41/12; H04L 47/825; H04L 43/50; H04L 45/28; H04L 12/6418; H04L 45/22; G06F 11/08; G06F 9/45558
See application file for complete search history.

(56) References Cited

U.S. PATENT DOCUMENTS

| | | | | |
|---|---|---|---|---|
| 10,050,855 | B1* | 8/2018 | Singh | H04L 45/245 |
| 10,135,739 | B2* | 11/2018 | Raindel | H04L 69/22 |
| 2014/0019581 | A1* | 1/2014 | Baillargeon | H04L 41/0613 |
| | | | | 709/217 |
| 2014/0348006 | A1* | 11/2014 | Jain | H04L 12/4641 |
| | | | | 370/245 |
| 2014/0351812 | A1* | 11/2014 | Imai | H04L 12/4633 |
| | | | | 718/1 |
| 2015/0195137 | A1* | 7/2015 | Kashyap | H04L 61/103 |
| | | | | 370/254 |
| 2015/0244617 | A1* | 8/2015 | Nakil | H04L 41/0631 |
| | | | | 709/224 |
| 2015/0281128 | A1* | 10/2015 | Sindhu | H04L 45/64 |
| | | | | 370/355 |
| 2015/0295729 | A1* | 10/2015 | Bevinamarad | H04L 12/4633 |
| | | | | 370/474 |
| 2015/0358232 | A1* | 12/2015 | Chen | H04L 49/3009 |
| | | | | 370/392 |
| 2015/0381495 | A1 | 12/2015 | Cherian et al. | |
| 2016/0285977 | A1* | 9/2016 | Ng | H04L 12/4633 |
| 2017/0063783 | A1* | 3/2017 | Yong | H04L 67/2814 |
| 2017/0104660 | A1* | 4/2017 | Wexler | H04L 41/04 |
| 2017/0214549 | A1 | 7/2017 | Yoshino et al. | |
| 2018/0176124 | A1* | 6/2018 | Kancherla | H04L 45/22 |
| 2019/0036736 | A1* | 1/2019 | Gao | H04L 61/6022 |
| 2019/0109783 | A1* | 4/2019 | Kommula | H04L 41/0668 |
| 2019/0132150 | A1* | 5/2019 | Ramachandran | H04L 12/4641 |
| 2019/0140940 | A1* | 5/2019 | Shah | H04L 12/4633 |
| 2019/0190892 | A1* | 6/2019 | Menachem | H04L 63/164 |
| 2019/0199636 | A1* | 6/2019 | Narayanan | H04L 45/7453 |
| 2019/0297009 | A1* | 9/2019 | Xu | H04L 45/50 |
| 2020/0045016 | A1* | 2/2020 | Chor | H04L 63/0428 |
| 2020/0067839 | A1* | 2/2020 | Iny | H04L 47/34 |
| 2021/0136049 | A1* | 5/2021 | Wang | H04L 63/164 |

FOREIGN PATENT DOCUMENTS

| | | | |
|---|---|---|---|
| CN | 103490972 A | 1/2014 | |
| CN | 107547366 A | 1/2018 | |
| CN | 107733813 A | 2/2018 | |
| EP | 2928134 A2 | 10/2015 | |
| WO | 2014189709 A1 | 11/2014 | |
| WO | WO-2018040529 A1 * | 3/2018 | ......... H04L 12/4633 |

* cited by examiner

| 0 | | | | | | | | | 1 | | | | | | | | | 2 | | | | | | | | | 3 | |
|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 | 1 |
| R | R | R | R | I | R | S | R | Sequence number ||||||||||||||||||||
| VNI |||||||||||||||||| Reserved ||||||||

| 0 | | | | | | | | | 1 | | | | | | | | | 2 | | | | | | | | | 3 | |
|---|---|---|---|---|---|---|---|---|---|---|---|---|---|---|---|---|---|---|---|---|---|---|---|---|---|---|---|
| Version | Options length ||||||| O | C | Reserved |||||| Protocol type ||||||||||||||
| VNI |||||||||||||||||||||||| Reserved ||||||||
| Options class |||||||||||||||| Type |||||| R | R | R | Length |||||
| Sequence number |||||||||||||||||||||||||||||||

DATA TRAFFIC PROCESSING METHOD, DEVICE, AND SYSTEM

CROSS-REFERENCE TO RELATED APPLICATIONS

This application is a continuation of International Application No. PCT/CN2018/117989, filed on Nov. 28, 2018, which claims priority to Chinese Patent Application No. 201810241895.6, filed on Mar. 22, 2018. The disclosures of the aforementioned applications are hereby incorporated by reference in their entireties.

TECHNICAL FIELD

This application relates to the field of communications technologies, and in particular, to a data traffic processing method, a device, and a system.

BACKGROUND

A virtual extensible local area network (VXLAN) technology is a technology that encapsulates a layer 2 packet by using a layer 3 protocol. The VXLAN technology relates to a packet in a MAC-in-UDP format. Specifically, an Ethernet frame based on a media access control (MAC) protocol is encapsulated in a user datagram protocol (UDP) packet. Further, the UDP packet is encapsulated in an internet protocol (IP) packet. The IP packet may be transmitted in a layer 3 network. Therefore, the Ethernet frame is transmitted in the layer 3 network. In the VXLAN technology, a VXLAN network identifier (VNI) is used to identify a VXLAN network segment. Different VXLAN network segments correspond to different VNIs, and the different VXLAN network segments are isolated from each other. Two virtual machines (VM) with a same VNI may directly communicate with each other. In other words, the two VMs with the same VNI communicate with each other without using a VXLAN layer 3 gateway (VXLAN L3 gateway). Two VMs with different VNIs need to communicate with each other by using the VXLAN layer 3 gateway. A VNI field includes 24 bits. One management domain may include a maximum of $2^{16}$ VXLAN network segments.

A VXLAN tunnel endpoint (VTEP) device is an edge device in a VXLAN. The VTEP device transmits traffic of the VXLAN through a VXLAN tunnel, and the VXLAN tunnel is a point-to-point logical tunnel between two VTEP devices.

In actual application, the VXLAN tunnel may include one or a plurality of links. When the VXLAN tunnel includes the plurality of links, a VTEP device used as a transmit end usually sends data traffic to a VTEP device used as a receive end in a per-flow load balancing manner. However, the per-flow load balancing manner may cause a relatively large difference between bandwidth utilization of different links in the plurality of links. As a result, bandwidth utilization of the VXLAN tunnel is low.

SUMMARY

In view of this, embodiments of this application provide a data traffic processing method, a device, and a system, to transmit data traffic through a VXLAN tunnel in a per-packet load balancing manner. This helps increase bandwidth utilization of the VXLAN tunnel.

Technical solutions provided in the embodiments of this application are as follows:

According to a first aspect, a data traffic processing method is provided. The data traffic processing method is applied to a VXLAN, the VXLAN includes a first network device and a second network device, the first network device is connected to the second network device through a VXLAN tunnel, and the VXLAN tunnel includes a first link and a second link. The method includes: receiving, by the first network device on the first link, a first VXLAN packet sent by the second network device, where the first VXLAN packet includes a first sequence number and a first service packet, and the first sequence number indicates a location of the first service packet in a plurality of service packets; decapsulating, by the first network device, the first VXLAN packet; receiving, by the first network device on the second link, a second VXLAN packet sent by the second network device, where the second VXLAN packet includes a second sequence number and a second service packet, and the second sequence number indicates a location of the second service packet in the plurality of service packets; after the first network device decapsulates the first VXLAN packet, determining, by the first network device, whether the second sequence number is a next sequence number of the first sequence number; and when the first network device determines that the second sequence number is the next sequence number of the first sequence number, decapsulating, by the first network device, the second VXLAN packet.

Based on the solution provided in this embodiment, the first VXLAN packet is transmitted on the first link, and the second VXLAN packet is transmitted on the second link. The first VXLAN packet includes the first sequence number, and the second VXLAN packet includes the second sequence number. Therefore, in the foregoing technical solution, traffic is transmitted in a per-packet load balancing manner. Compared with a per-flow load balancing manner, the technical solution provided in this application helps lessen a difference between bandwidth utilization of a first tunnel and bandwidth utilization of a second tunnel. Further, this helps increase bandwidth utilization of the VXLAN tunnel.

In addition, the second sequence number is the next sequence number of the first sequence number, indicating that a time at which the first network device sends the first VXLAN packet is earlier than a time at which the first network device sends the second VXLAN packet. In the technical solution of this application, when the second sequence number is the next sequence number of the first sequence number, regardless of whether the first VXLAN packet arrives at the first network device before the second VXLAN packet or the first VXLAN packet arrives at the first network device after the second VXLAN packet, the first network device decapsulates the first VXLAN packet before decapsulating the second VXLAN packet. Therefore, the first network device obtains the first service packet before obtaining the second service packet, so that the first network device can send the first service packet before sending the second service packet. It is assumed that a sending VM needs to transmit the plurality of service packets to a receiving VM through the VXLAN. A time at which the sending VM sends the first service packet is earlier than a time at which the sending VM sends the second service packet. The second network device receives the first service packet before receiving the second service packet. The second network device separately encapsulates the first service packet and the second service packet into the first VXLAN packet and the second VXLAN packet. The second network device separately sends the first VXLAN packet and the second VXLAN packet to the first network device on the first link and the second link. A sending time of the first VXLAN packet is earlier than a sending time of the second VXLAN packet. Because congestion degrees of the first link and the second link are different, a time at which the first VXLAN packet arrives at the first network device is later than a time at which the second VXLAN packet arrives at the first network device. A time at which the first network device decapsulates the first VXLAN packet based on the first sequence number is earlier than a time at which the first network device decapsulates the second VXLAN packet based on the second sequence number. Therefore, the first network device obtains the first service packet before obtaining the second service packet. Further, when sending the plurality of service packets to the receiving VM, the first network device may send the first service packet before sending the second service packet, so that a sequence of receiving the plurality of service packets by the receiving VM is consistent with a sequence of sending the plurality of service packets by the sending VM. In this way, the foregoing technical solution helps reduce packet disorder.

In a possible implementation of the first aspect, the method further includes: when the first network device determines that the second sequence number is not the next sequence number of the first sequence number in the first VXLAN packet that has been decapsulated by the first network device, storing, by the first network device, the second VXLAN packet in a memory.

In another possible implementation of the first aspect, the method further includes: determining, by the first network device, whether the memory stores a third VXLAN packet, where the third VXLAN packet is a VXLAN packet received by the first network device on the first link or the second link, the third VXLAN packet includes a third sequence number and a third service packet, the third sequence number indicates a location of the third service packet in the plurality of service packets, and the third sequence number is a next sequence number of the first sequence number in the first VXLAN packet that has been decapsulated by the first network device; and when the first network device determines that the memory stores the third VXLAN packet, decapsulating, by the first network device, the third VXLAN packet.

In another possible implementation of the first aspect, the method further includes: when residence time of a fourth VXLAN packet in the memory is greater than or equal to a first time threshold, determining, by the first network device, whether a value of a fourth sequence number is less than a value of a sequence number included in another VXLAN packet stored in the memory, and determining, by the first network device, whether the value of the fourth sequence number is greater than a value of the first sequence number in the first VXLAN packet that has been decapsulated by the first network device, where the fourth VXLAN packet is a VXLAN packet received by the first network device on the first link or the second link, the fourth VXLAN packet includes the fourth sequence number and a fourth service packet, and the fourth sequence number indicates a location of the fourth service packet in the plurality of service packets; and when the first network device determines that the value of the fourth sequence number is less than the value of the sequence number included in the another VXLAN packet stored in the memory, and the value of the fourth sequence number is greater than the value of the first sequence number in the first VXLAN packet that has been decapsulated by the first network device, decapsulating, by the first network device, the fourth VXLAN packet.

In another possible implementation of the first aspect, the method further includes: when residence time of a fourth VXLAN packet in the memory is greater than or equal to a first time threshold, determining, by the first network device, whether a value of a fourth sequence number is greater than a value of a sequence number included in another VXLAN packet stored in the memory, where the fourth VXLAN packet is a VXLAN packet received by the first network device on the first link or the second link, the fourth VXLAN packet includes the fourth sequence number and a fourth service packet, and the fourth sequence number indicates a location of the fourth service packet in the plurality of service packets; and when the first network device determines that the value of the fourth sequence number is greater than the value of the sequence number included in the another VXLAN packet stored in the memory, resetting, by the first network device, the residence time of the fourth VXLAN packet in the memory, and re-counting the residence time of the fourth VXLAN packet in the memory.

In another possible implementation of the first aspect, the method further includes: when residence time of a fourth VXLAN packet in the memory is greater than or equal to a first time threshold, determining, by the first network device, whether a value of a fourth sequence number is less than a value of a sequence number included in another VXLAN packet stored in the memory, and determining, by the first network device, whether an absolute value of a difference between the value of the fourth sequence number and a value of the first sequence number in the first VXLAN packet that has been decapsulated by the first network device is greater than a first sequence number threshold, where the fourth VXLAN packet is a VXLAN packet received by the first network device on the first link or the second link, the fourth VXLAN packet includes the fourth sequence number and a fourth service packet, the fourth sequence number indicates a location of the fourth service packet in the plurality of service packets, and a range of the first sequence number threshold is [0.5N, N], where N indicates an upper limit value of a sequence number in a VXLAN packet sent by the second network device; and when the first network device determines that the value of the fourth sequence number is less than the value of the sequence number included in the another VXLAN packet stored in the memory, and the absolute value of the difference between the value of the fourth sequence number and the value of the first sequence number in the first VXLAN packet that has been decapsulated by the first network device is greater than the first sequence number threshold, decapsulating, by the first network device, the fourth VXLAN packet.

According to a second aspect, a data traffic processing method is provided. The data traffic processing method is applied to a virtual extensible local area network VXLAN, the VXLAN includes a first network device and a second network device, the first network device is connected to the second network device through a VXLAN tunnel, and the VXLAN tunnel includes a first link and a second link. The method includes: receiving, by the second network device, a plurality of service packets from a virtual machine VM, where the plurality of service packets include a first service packet and a second service packet; generating, by the second network device, a first VXLAN packet based on the first service packet, where the first VXLAN packet includes a first sequence number and the first service packet, and the first sequence number indicates a location of the first service packet in the plurality of service packets; sending, by the second network device, the first VXLAN packet to the first network device on the first link; generating, by the second network device, a second VXLAN packet based on the second service packet, where the second VXLAN packet includes a second sequence number and the second service packet, the second sequence number indicates a location of the second service packet in the plurality of service packets, and the second sequence number is a next sequence number of the first sequence number; and after the second network device sends the first VXLAN packet to the first network device on the first link, sending, by the second network device, the second VXLAN packet to the first network device on the second link.

Based on the solution provided in this embodiment, in the VXLAN, data traffic is transmitted through the VXLAN tunnel in an ordered per-packet load balancing manner. This reduces packet disorder and increases bandwidth utilization of the VXLAN tunnel.

In the first aspect or the second aspect, optionally, the first VXLAN packet includes a VXLAN header, and the VXLAN header includes the first sequence number.

In the first aspect or the second aspect, optionally, the first VXLAN packet includes a generic network virtualization encapsulation GENEVE header, the GENEVE header includes a sequence number type-length-value TLV, and the sequence number TLV includes the first sequence number.

In the first aspect or the second aspect, optionally, the first VXLAN packet further includes an identifier of a first data flow, and the first data flow includes the plurality of service packets.

According to a third aspect, a first network device is provided. The first network device has a function of implementing behaviors of the first network device in the foregoing methods. The function may be implemented based on hardware, or may be implemented based on hardware executing corresponding software. The hardware or the software includes one or more modules corresponding to the foregoing function.

In a possible design, a structure of the first network device includes a processor and an interface. The processor is configured to support the first network device in performing a corresponding function in the foregoing methods. The interface is configured to: support communication between the first network device and a second network device; and send information or an instruction in the foregoing methods to the second network device, or receive information or an instruction in the foregoing methods from the second network device. The first network device may further include a memory. The memory is coupled to the processor, and the memory stores a program instruction and data that are necessary for the first network device.

In another possible design, the first network device includes a processor, a transmitter, a receiver, a random access memory, a read-only memory, and a bus. The processor is coupled to the transmitter, the receiver, the random access memory, and the read-only memory by using the bus. When the first network device needs to run, a bootloader in a basic input/output system or an embedded system that is built into the read-only memory is used to boot a system to start, and boot the first network device to enter a normal running state. After the first network device enters the normal running state, an application program and an operating system run in the random access memory, to enable the processor to perform the method in any one of the first aspect or the possible implementations of the first aspect.

According to a fourth aspect, a first network device is provided. The first network device includes a main control board and an interface board, and may further include a switching board. The first network device is configured to perform the method in any one of the first aspect or the possible implementations of the first aspect. Specifically, the first network device includes modules configured to perform the method in any one of the first aspect or the possible implementations of the first aspect.

According to a fifth aspect, a first network device is provided. The first network device includes a controller and a first forwarding sub-device. The first forwarding sub-device includes an interface board, and may further include a switching board. The first forwarding sub-device is configured to perform a function of the interface board in the fourth aspect, and may further perform a function of the switching board in the fourth aspect. The controller includes a receiver, a processor, a transmitter, a random access memory, a read-only memory, and a bus. The processor is separately coupled to the receiver, the transmitter, the random access memory, and the read-only memory by using the bus. When the controller needs to run, a bootloader in a basic input/output system or an embedded system that is built into the read-only memory is used to boot a system to start, and boot the controller to enter a normal running state. After the controller enters the normal running state, an application program and an operating system run in the random access memory, to enable the processor to perform a function of the main control board in the fourth aspect.

According to a sixth aspect, a computer storage medium is provided and is configured to store a program, code, or an instruction used by the foregoing first network device, and when a processor or a hardware device executes the program, the code, or the instruction, functions or steps of the first network device in the foregoing aspects may be completed.

According to a seventh aspect, a second network device is provided. The second network device has a function of implementing behaviors of the second network device in the foregoing methods. The function may be implemented based on hardware, or may be implemented based on hardware executing corresponding software. The hardware or the software includes one or more modules corresponding to the foregoing function.

In a possible design, a structure of the second network device includes a processor and an interface. The processor is configured to support the second network device in performing a corresponding function in the foregoing methods. The interface is configured to: support communication between the second network device and a first network device; and send information or an instruction in the foregoing methods to the first network device, or receive information or an instruction in the foregoing methods from the first network device. The second network device may further include a memory. The memory is coupled to the processor, and the memory stores a program instruction and data that are necessary for the second network device.

In another possible design, the second network device includes a processor, a transmitter, a receiver, a random access memory, a read-only memory, and a bus. The processor is coupled to the transmitter, the receiver, the random access memory, and the read-only memory by using the bus. When the second network device needs to run, a bootloader in a basic input/output system or an embedded system that is built into the read-only memory is used to boot a system to start, and boot the second network device to enter a normal running state. After the second network device enters the normal running state, an application program and an operating system run in the random access memory, to enable the processor to perform the method in any one of the second aspect or the possible implementations of the second aspect.

According to an eighth aspect, a second network device is provided. The second network device includes a main control board and an interface board, and may further include a switching board. The second network device is configured to perform the method in any one of the second aspect or the possible implementations of the second aspect. Specifically, the second network device includes modules configured to perform the method in any one of the second aspect or the possible implementations of the second aspect.

According to a ninth aspect, a second network device is provided. The second network device includes a controller and a second forwarding sub-device. The second forwarding sub-device includes an interface board, and may further include a switching board. The second forwarding sub-device is configured to perform a function of the interface board in the eighth aspect, and may further perform a function of the switching board in the eighth aspect. The controller includes a receiver, a processor, a transmitter, a random access memory, a read-only memory, and a bus. The processor is separately coupled to the receiver, the transmitter, the random access memory, and the read-only memory by using the bus. When the controller needs to run, a bootloader in a basic input/output system or an embedded system that is built into the read-only memory is used to boot a system to start, and boot the controller to enter a normal running state. After the controller enters the normal running state, an application program and an operating system run in the random access memory, to enable the processor to perform a function of the main control board in the eighth aspect.

According to a tenth aspect, a computer storage medium is provided and is configured to store a program, code, or an instruction used by the foregoing second network device, and when a processor or a hardware device executes the program, the code, or the instruction, functions or steps of the second network device in the foregoing aspects may be completed.

According to an eleventh aspect, a network system is provided. The network system includes a first network device and a second network device. The first network device is the first network device in the third aspect, the fourth aspect, or the fifth aspect, and the second network device is the second network device in the seventh aspect, the eighth aspect, or the ninth aspect.

According to the foregoing solutions, the embodiments of this application provide a data traffic processing method, a device, and a system. The data traffic processing method, the device, and the system are applied to a VXLAN scenario. The second network device transmits a plurality of VXLAN packets to the first network device on a plurality of links included in the VXLAN tunnel in the per-packet load balancing manner, and loads carried in the plurality of VXLAN packets belong to a same data flow. Each of the plurality of VXLAN packets includes a sequence number. Correspondingly, after receiving a VXLAN packet sent by the second network device, the first network device processes the VXLAN packet based on a sequence number carried in the VXLAN packet and a current sequence number stored in the first network device. In this way, the sequence number is applied to transmission of the VXLAN packet, so that data traffic is transmitted through the VXLAN tunnel in the ordered per-packet load balancing manner. This reduces packet disorder and increases bandwidth utilization of the VXLAN tunnel.

DETAILED DESCRIPTION OF ILLUSTRATIVE EMBODIMENTS

The following separately provides detailed descriptions by using specific embodiments.

Figure 1:
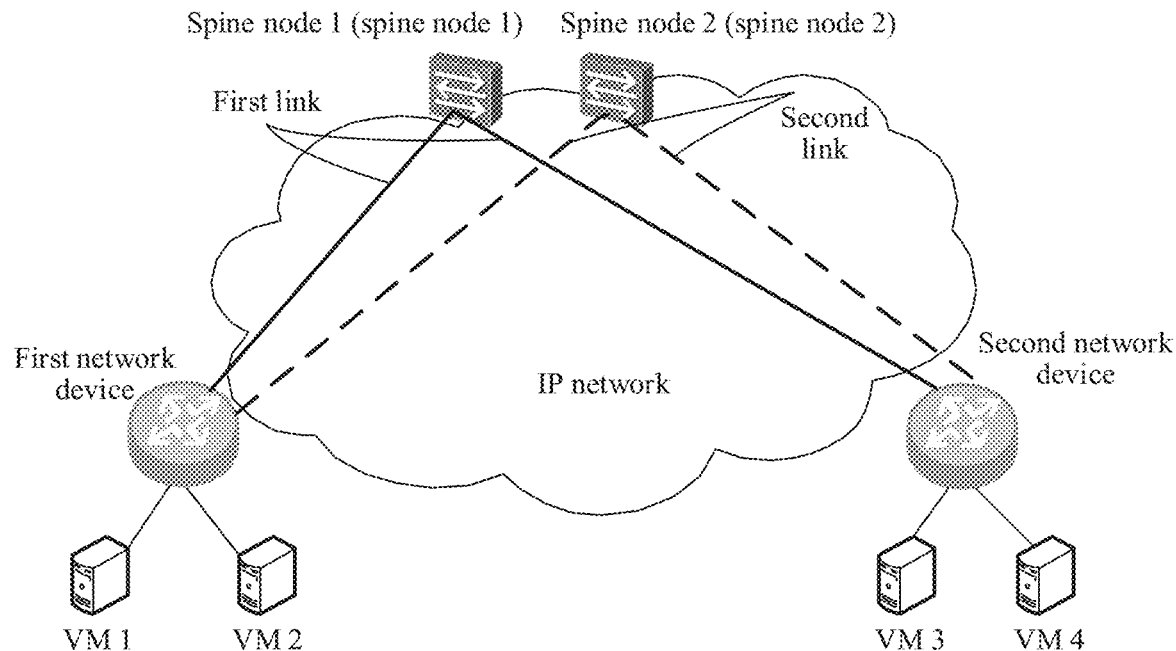
FIG. 1 is a schematic diagram of a structure of a network according to an embodiment of this application.

FIG. 1 is a schematic diagram of a structure of a network according to an embodiment of this application. The network may be a virtual extensible local area network (VXLAN), and the network includes a first network device and a second network device. A communications network between the first network device and the second network device may be an IP network. Specifically, the first network device communicates with the second network device on a first link, and the first network device communicates with the second network device on a second link. The first link further includes a spine node 1, and the second link further includes a spine node 2. Therefore, the second network device may send data traffic to the first network device on the first link and the spine node 1, and the second network device may alternatively send data traffic to the first network device on the second link and the spine node 2.

Figure 2:
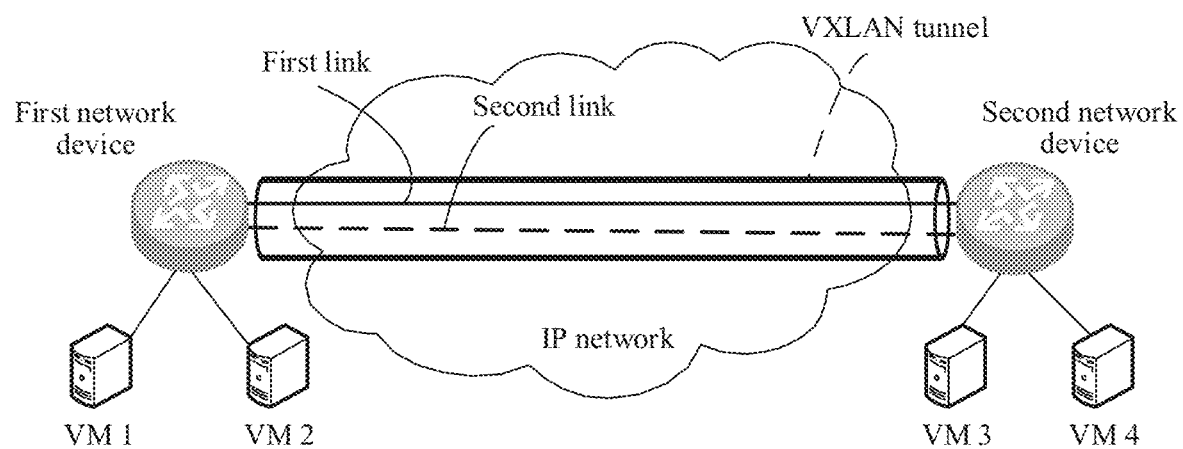
FIG. 2 is a schematic diagram of another structure of a network according to an embodiment of this application.

A VXLAN tunnel is established between the first network device and the second network device. The VXLAN tunnel includes the first link and the second link. The VXLAN tunnel is a logical tunnel between the first network device and the second network device. Specifically, the VXLAN tunnel is a logical tunnel carried on IP links (the first link and the second link). To more vividly reflect association between the VXLAN tunnel and the first link and the second link, the structure of the network in FIG. 1 may be vividly presented as a structure of a network shown in FIG. 2. FIG. 2 may be understood as a schematic diagram of a structure of a network, including the VXLAN tunnel, the first link, and the second link but omitting the spine node 1 and the spine node 2. FIG. 1 and FIG. 2 show that the VXLAN tunnel includes two links. It should be understood that the VXLAN tunnel may include more than two links, and all the links included in the VXLAN tunnel may be implemented based on structures of the first link and the second link.

In an actual application scenario, the first network device and the second network device may be referred to as provider edge (PE) devices. Specifically, the first network device and the second network device each may include a router or a layer 3 switch. In this embodiment of this application, the first network device and the second network device are respectively located at two ends of the VXLAN tunnel. Therefore, the first network device and the second network device may be referred to as VTEP devices. In a VXLAN application scenario, the VTEP device may also be referred to as a network virtualization edge (NVE) device. In some application scenarios, the VTEP device is understood as a module integrated in the NVE device. In this application, without special description, the VTEP device is equivalent to the NVE device.

The spine node 1 and the spine node 2 each may include a router or a layer 3 switch. The spine node 1 and the spine node 2 are configured to receive traffic data from the first network device, and forward the traffic data to the second network device. Alternatively, the spine node 1 and the spine node 2 are configured to receive traffic data from the second network device, and forward the traffic data to the first network device. The network structure shown in FIG. 1 may be applied to a data center (DC), to be specific, the DC includes a first network device and a second network device shown in FIG. 1. The first network device and the second network device may communicate with a network node outside the DC on the spine node 1 and the spine node 2. In a possible implementation, there may further have another network device on the first link and/or the second link. For example, the first network device communicates with the second network device on the first link, a third network device, and the spine node 1. In another possible implementation, there is no network device on the first link and/or the second link. For example, as shown in FIG. 2, the first network device and the second network device directly communicate with each other on the first link and the second link.

The first network device and the second network device each may be connected to a VM. As shown in FIG. 1, the first network device is connected to a VM 1 and a VM 2, and the second network device is connected to a VM 3 and a VM 4. Therefore, the first network device may receive data traffic from the VM 1 or the VM 2, and forward the data traffic to the second network device through the VXLAN tunnel. Alternatively, the first network device receives data traffic from the second network device through the VXLAN tunnel, and delivers the data traffic to the VM 1 or the VM 2. Similarly, the second network device may perform a same operation, and details are not described herein. The VM may be referred to as a host. Specifically, the VM may be a router or a switch. In addition, a quantity of VMs is not limited in this application, and the first network device may be connected to a plurality of VMs. The VM may run on a server. One server may include at least one VM. In a possible implementation, one server may include a plurality of VMs, and different VMs may belong to different VXLAN network segments.

In the network shown in FIG. 1, the VXLAN tunnel includes the first link and the second link. The first link and the second link are used to transmit data traffic in a load balancing manner. In a subsequent embodiment of this application, an example in which the second network device sends data traffic to the first network device is used for description. It should be understood that the first network device may send data traffic to the second network device in a same implementation.

In the network shown in FIG. 1, the second network device may transmit data traffic to the first network device on the first link and the second link in a per-flow load balancing manner. The per-flow load balancing manner refers to performing load balancing in a form of data flows. The second network device receives a plurality of service packets sent by the VM 3 and the VM 4, where the plurality of service packets belong to a same data flow. The data flow is named a data flow 01. The second network device receives the plurality of service packets from the VM 3 or the VM 4, and encapsulates each of the plurality of service packets into a VXLAN packet according to a VXLAN protocol. Therefore, in this application, a VXLAN packet includes a service packet, and all the service packets in the VXLAN packets belong to the data flow 01. The second network device sends the plurality of VXLAN packet to the first network device on the first link. Because the per-flow load balancing manner is used, the plurality of VXLAN packets are not shared on the second link for transmission. In other words, the plurality of service packets that belong to the data flow 01 are transmitted by the first network device to the second network device through only one link in the VXLAN tunnel. It is assumed that in this case, the second network device further receives a plurality of service packets that are sent by the VM 3 or the VM 4 and that belong to another data flow. The data flow is named a data flow 02. After receiving the plurality of service packets that belong to the data flow 02, the second network device encapsulates, in the per-flow load balancing manner, the plurality of service packets that belong to the data flow 02 into a plurality of VXLAN packets, and sends the plurality of VXLAN packets to the first network device on the second link. In the per-flow load balancing manner, service packets of a same data flow are transmitted on only one link, and therefore there is no packet disorder. However, this manner may cause a waste of bandwidths of the VXLAN tunnel. For example, a data amount of the data flow 01 transmitted on the first link is greater than a data amount of the data flow 02 transmitted on the second link. In this way, after the data flow 02 is transmitted on the second link, the data flow 01 is still transmitted on the first link. In this case, the second link is idle, thereby causing the waste of the bandwidths of the VXLAN tunnel.

In the network shown in FIG. 1, it is assumed that the second network device transmits data traffic to the first network device on the first link and the second link in a per-packet load balancing manner. The per-packet load balancing manner refers to performing load balancing in a form of packets. After receiving the plurality of service packets that belong to the data flow 01, the second network device encapsulates the plurality of service packets into the plurality of VXLAN packets according to the VXLAN protocol. All the service packets included in the VXLAN packets belong to the data flow 01. The second network device sends the plurality of VXLAN packets to the first network device on the first link in the per-packet load balancing manner. Service packets that belong to a same data flow are transmitted on two links. Because the two links have different bandwidths, delays, packet loss rates, and jitters, it cannot be ensured that the plurality of VXLAN packets are received by a VM connected to a receive end in an original sending sequence. Therefore, when the traditional per-packet load balancing manner is applied to the VXLAN, packet disorder occurs.

The embodiments of this application provide a data traffic processing method, a device, and a system, to transmit data traffic through a VXLAN tunnel in an ordered per-packet load balancing manner. This reduces packet disorder and increases bandwidth utilization of the VXLAN tunnel. As shown in FIG. 1, the second network device transmits the plurality of VXLAN packets to the first network device on the first link and the second link in the per-packet load balancing manner, and the service packets carried in the plurality of VXLAN packets belong to a same data flow. Each of the plurality of VXLAN packets includes a sequence number, and the sequence number is used to indicate a location, in the plurality of service packets, of a service packet carried in each of the plurality of VXLAN packets. After receiving a VXLAN packet sent by the second network device, the first network device processes the VXLAN packet based on a sequence number carried in the VXLAN packet and a sequence number of a latest decapsulated VXLAN packet in the first network device. A service packet carried in the VXLAN packet and a service packet carried in the latest decapsulated VXLAN packet belong to a same data flow. The same data flow includes the plurality of service packets. For example, the same data flow may be a data flow sent by one VM to another VM. For example, a data flow sent by a VM 0 to the VM 1 is one data flow, and a data flow sent by the VM 0 to the VM 2 is another data flow. For another example, when the data flow sent by one VM to another VM includes data flows of different types, the same data flow may be data flows of a type. For example, the data flow sent by the VM 0 to the VM 1 includes a voice flow and a video flow. The voice flow sent by the VM 0 to the VM 1 is one data flow, and the video flow sent by the VM 0 to the VM 1 is another data flow.

For example, the first network device has decapsulated a VXLAN packet 01, and the VXLAN packet 01 is a latest decapsulated VXLAN packet of the first network device. After receiving a VXLAN packet 02, the first network device processes the VXLAN packet 02 based on a sequence number included in the VXLAN packet 02 and a sequence number included in the VXLAN packet 01. A service packet included in the VXLAN packet 02 and a service packet included in the VXLAN packet 01 belong to a same data flow.

Correspondingly, in the VXLAN, for an implementation in which the first network device and the second network device transmit a data flow by using sequence numbers in the per-packet load balancing manner, refer to descriptions of subsequent implementations.

Figure 3:
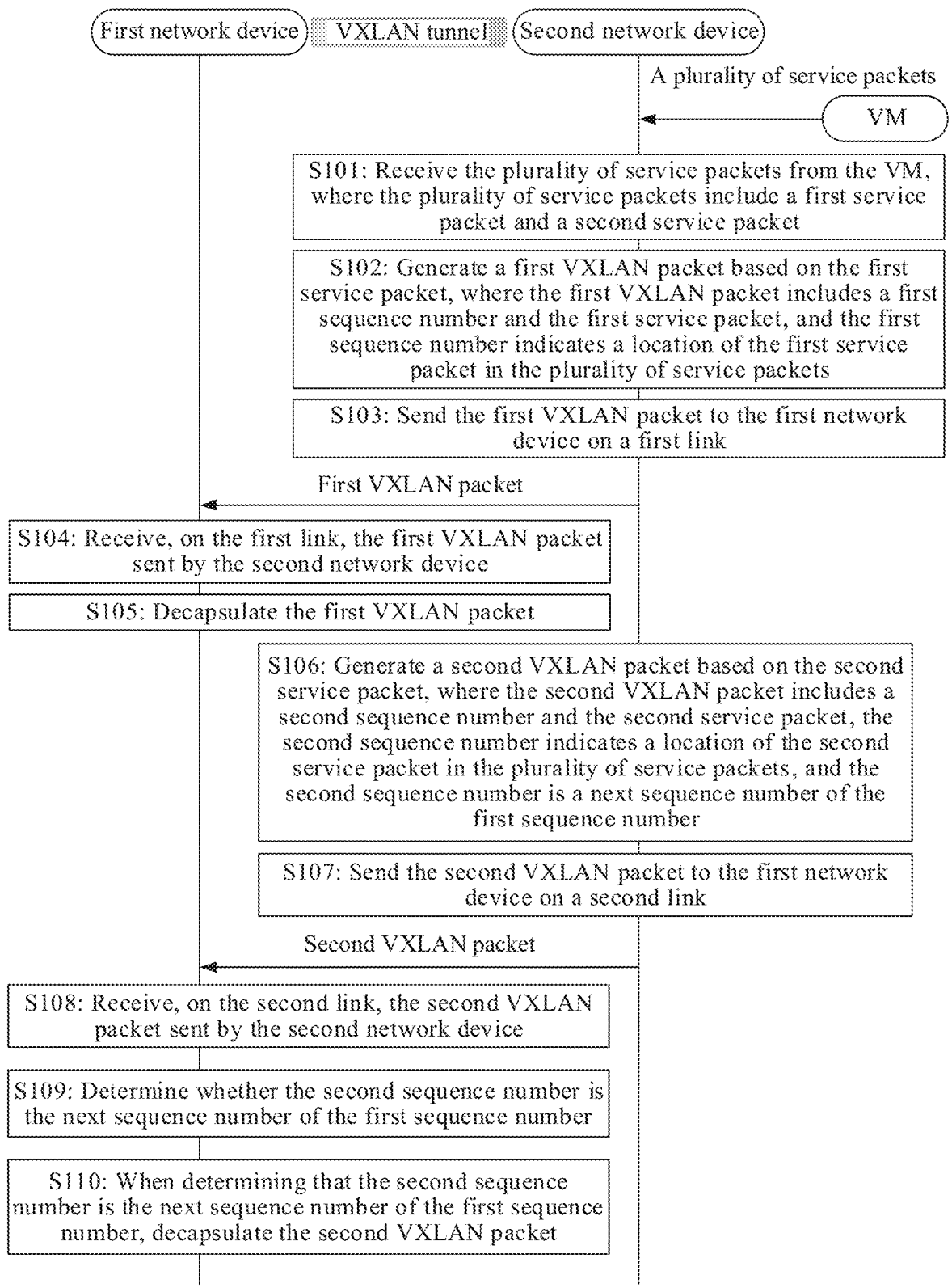
FIG. 3 is a flowchart of a data traffic processing method according to an embodiment of this application.

FIG. 3 is a flowchart of a data traffic processing method according to an embodiment of this application. The method shown in FIG. 3 may be applied to the network structure shown in FIG. 1 or FIG. 2. Specifically, the data traffic processing method is applied to a VXLAN, the VXLAN includes a first network device and a second network device, the first network device is connected to the second network device through a VXLAN tunnel, and the VXLAN tunnel includes a first link and a second link. The method includes the following steps.

S101: The second network device receives a plurality of service packets from a VM, where the plurality of service packets include a first service packet and a second service packet.

In this embodiment of this application, an example in which the second network device sends data traffic to the first network device through the VXLAN tunnel is used for description. As shown in FIG. 1, the second network device receives the plurality of service packets from the VM 3 or the VM 4, and the plurality of service packets are expected to be sent to the VM 1 or the VM 2 connected to the first network device. The plurality of service packets belong to a same data flow. The plurality of service packets include the first service packet and the second service packet. For ease of description, in this embodiment of this application, the VM 3 is used as a source end and the VM 1 is used as a destination end for description. Correspondingly, in this embodiment of this application, the data flow to which the plurality of service packets belong are named the data flow 01. Therefore, a source MAC address of the data flow 01 is a MAC address of the VM 3, and a destination MAC address of the data flow 01 is a MAC address of the VM 1. A source IP address of the data flow 01 is an IP address of the VM 3, and a destination IP address is an IP address of the VM 1. The data flow 01 includes the plurality of service packets. A type definition of the data flow 01 is not limited in this application. In a possible implementation, a type of the data flow 01 may be defined based on a destination address. For example, data traffic whose destination is the VM 1 belongs to the data flow 01. In another possible implementation, a type of the data flow 01 may be defined based on a service type. For example, the video traffic belongs to the data flow 01 or the voice traffic belongs to the data flow 01.

S102: The second network device generates a first VXLAN packet based on the first service packet, where the first VXLAN packet includes a first sequence number and the first service packet, and the first sequence number indicates a location of the first service packet in the plurality of service packets.

After receiving the plurality of service packets from the VM 3, the second network device performs VXLAN encapsulation on the plurality of service packets according to the VXLAN protocol. Specifically, the second network device encapsulates, according to the VXLAN protocol, each of the plurality of service packets that belong to the data flow 01 into the VXLAN packet, to generate the plurality of VXLAN packets. Each of the plurality of VXLAN packets includes a payload, and the payload includes the service packet. Therefore, all the service packets carried in the plurality of VXLAN packets belong to the data flow 01.

In this embodiment of this application, after the second network device receives the first service packet, the second network device generates the first VXLAN packet based on the first service packet. The first VXLAN packet includes a VXLAN header, the VXLAN header includes a VNI, and the VNI is used to identify a VXLAN network segment. In this embodiment of this application, for ease of description, it is assumed that the VM 3 and the VM 1 belong to a same VXLAN network segment. For example, a value of each VNI is VNI_10. The first VXLAN packet further includes a source VTEP address and a destination VTEP address. The source VTEP address is a VTEP address of the second network device, and the destination VTEP address is a VTEP address of the first network device. The VTEP address includes an IP address. The source VTEP address and the destination VTEP address ensure that the first VXLAN packet can be transmitted through the VXLAN tunnel between the second network device and the first network device.

In this embodiment of this application, the first VXLAN packet further includes the first sequence number and the first service packet. The first sequence number is used to indicate, in the plurality of service packets, the location of the first service packet carried in the first VXLAN packet. To be specific, the first sequence number indicates, in the data flow 01, a location of the first service packet encapsulated in the first VXLAN packet. For example, a start value of a sequence number is 1, and a first step value of the sequence number is 1. If a value of the first sequence number is 5, it indicates that the first service packet encapsulated in the first VXLAN packet is a fifth service packet in the data flow 01.

Optionally, the second network device stores a current sequence number. To distinguish a subsequently mentioned current sequence number stored in the first network device, the current sequence number stored in the second network device is referred to as a first current sequence number. A value of the first current sequence number indicates a value of a sequence number used when the second network device encapsulates a current VXLAN packet. For example, if the value of the first current sequence number is 5, a value of a sequence number carried in a VXLAN packet encapsulated by the second network device is 5. After encapsulating the VXLAN packet whose sequence number is 5, the second network device automatically adds a first step to the first current sequence number, so that the first current sequence number is used to encapsulate a next VXLAN packet. For example, the first step is 1. After encapsulating the VXLAN packet whose sequence number is 5, the second network device automatically updates the value of the first current sequence number to 6, so that the second network device encapsulates a VXLAN packet whose sequence number is 6. An initial value of the sequence number and a value of the first step are not limited in this application, and may be, for example, any positive integer.

Figures 4, 5, 6:
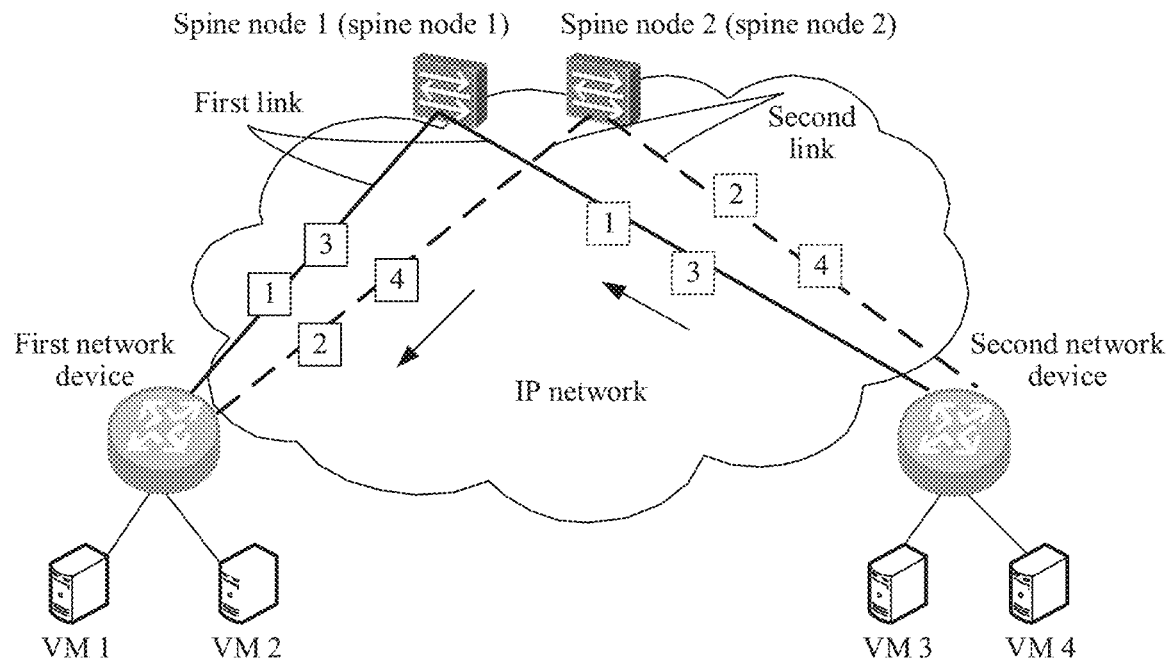
FIG. 4 is a schematic diagram of an application scenario according to an embodiment of this application.
FIG. 5 is a format diagram of a VXLAN header according to an embodiment of this application.
FIG. 6 is a format diagram of a GENEVE header according to an embodiment of this application.

In a possible implementation, the first sequence number is carried in the VXLAN header of the first VXLAN packet. As shown in FIG. 5, the VXLAN header includes a sequence number field, and the sequence number field is used to carry the first sequence number. The VXLAN header further includes an enable flag bit, and when the enable flag bit is set to 1, it indicates that the sequence number field is valid. "S" shown in FIG. 5 is used to implement the enable flag bit.

In another possible implementation, an encapsulation format of the first VXLAN packet may be alternatively encapsulation performed based on a generic network virtualization encapsulation (GENEVE) protocol. Specifically, the first VXLAN packet includes a GENEVE header. A format of the GENEVE header may be implemented in a manner shown in FIG. 6. The GENEVE header includes a version field, an options length field, a protocol type field, a flag bit (O and C), a VNI field, and a reserved field. For definitions of the foregoing fields, refer to related descriptions of the Internet Engineering Task Force (IETF) working group draft: draft-ietf-nvo3-geneve.

As shown in FIG. 6, the GENEVE header further includes a sequence number type-length-value (TLV), and the sequence number TLV is used to carry a sequence number. Specifically, the sequence number TLV may include an options class field, a type field, a length field, a flag bit (R, R, R), and the sequence number field. The options class field is used to indicate an optional type of a GENEVE. In this embodiment of this application, the options class field may be used to indicate that a TLV is the sequence number TLV, the type field is used to indicate a data format included in the sequence number field, and the length field is used to indicate a length of the sequence number TLV. The flag bit is a reserved control bit. The flag bit may be used for an enable sequence number field. For example, when a bit in the flag bit is set to 1, it indicates that the sequence number field is valid. The sequence number field is used to carry a value of a sequence number.

In this embodiment of this application, one data flow (the data flow oi) is used as an example for description. It should be understood that a plurality of data flows may be transmitted according to the method in this embodiment of this application. When the plurality of data flows are transmitted, the first VXLAN packet may carry an identifier of the data flow, and the identifier is used to identify the data flow. In this embodiment of this application, the identifier of the data flow may be referred to as a flow identifier.

In a possible implementation, the first VXLAN packet includes the VXLAN header (as shown in FIG. 5). When generating the first VXLAN packet, the second network device may perform Hash calculation on traffic information of an inner packet of the first VXLAN packet, and use a result of the Hash calculation as the flow identifier. The traffic information of the inner packet of the first VXLAN packet is traffic information of a payload of the first VXLAN packet, in other words, the traffic information of the first service packet. The traffic information may include one or more of the following information: a source IP address, a destination IP address, a source port number, a destination port number, and a transmission protocol. The second network device adds the result of the Hash calculation to a UDP header of the first VXLAN packet, and adds the result of the Hash calculation to a source port field in the UDP header. In this way, the UDP header is used in this embodiment of this application. On one hand, the UDP header is used to indicate the source port number. On the other hand, the UDP header is used to indicate a data flow to which the first service packet belongs.

Figure 7:
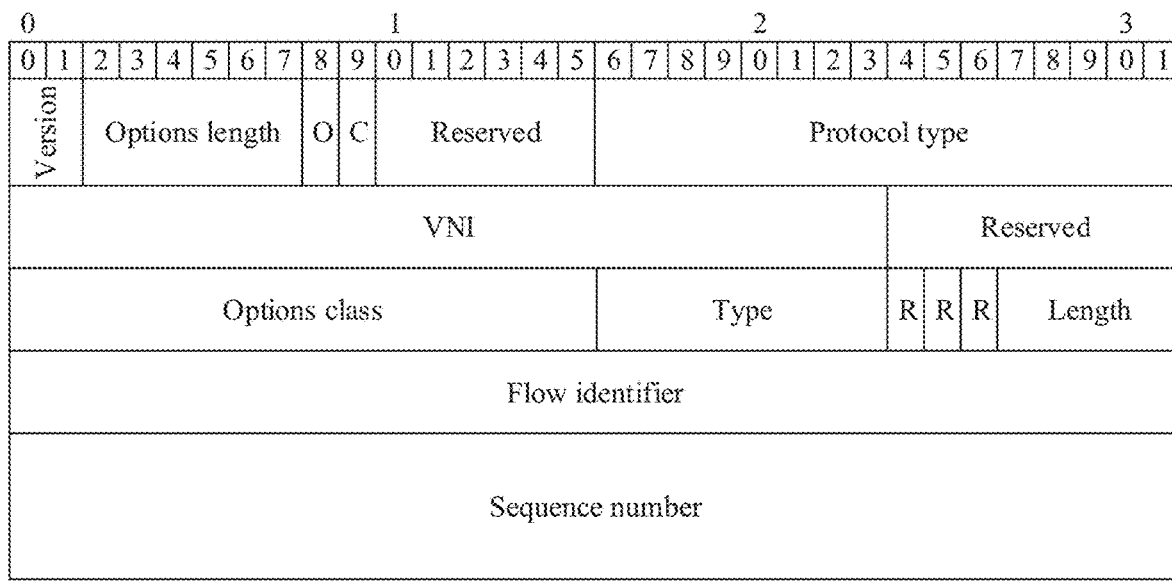
FIG. 7 is a format diagram of another GENEVE header according to an embodiment of this application.

In another possible implementation, the first VXLAN packet includes the VXLAN header (as shown in FIG. 6). The second network device may calculate traffic information of an inner packet of the first VXLAN packet by using a Hash algorithm in the same manner. Then, the second network device uses a result of hash calculation as the flow identifier, and adds the flow identifier to a sequence number TLV in a GENEVE header, as shown in FIG. 7. A difference between the format of the GENEVE header shown in FIG. 6 and a format of the GENEVE header shown in FIG. 7 lies in that a flow identifier field is added. The flow identifier field is used to carry a flow identifier of a data flow to which the first service packet in the first VXLAN packet belongs. In addition, any bit in a flag bit in FIG. 7 may be used to indicate whether the flow identifier field is valid.

S103: The second network device sends the first VXLAN packet to the first network device on the first link.

S104: The first network device receives the first VXLAN packet sent by the second network device on the first link.

After generating the first VXLAN packet, the second network device may send the first VXLAN packet to the first network device through the VXLAN tunnel. Specifically, the second network device may send the first VXLAN packet on the first link or the second link included in the VXLAN tunnel. In this embodiment of this application, an example in which the second network device sends the first VXLAN packet on the first link is used for description. Correspondingly, the first network device receives the first VXLAN packet on the first link.

S105: The first network device decapsulates the first VXLAN packet.

After obtaining the first VXLAN packet, the first network device may process the first VXLAN packet based on the first sequence number carried in the first VXLAN packet.

Specifically, the first network device determines, based on the first sequence number, whether to decapsulate the first VXLAN packet. For a process in which the first network device processes the first VXLAN packet based on the first sequence number, refer to descriptions of a second VXLAN packet in subsequent implementations of this application.

In an implementation of this application, it is assumed that the first network device determines, based on the first sequence number, to decapsulate the first VXLAN packet. In a possible implementation, the first service packet included in the first VXLAN packet is the first service packet in the plurality of service packets. For example, the first service packet is an initial packet of the data flow 01. The first network device decapsulates the first VXLAN packet. In another possible implementation, the first sequence number carried in the first VXLAN packet is a next sequence number of a sequence number included in a VXLAN packet that has been parsed by the first network device. For example, a value of a sequence number included in a VXLAN packet that has been currently parsed by the first network device is 5, and a value of the first sequence number carried in the first VXLAN packet is 6. Therefore, the first sequence number is a next sequence number of a sequence number whose value is 5, and the first network device decapsulates the first VXLAN packet.

S106: The second network device generates the second VXLAN packet based on the second service packet, where the second VXLAN packet includes a second sequence number and the second service packet, the second sequence number indicates a location of the second service packet in the plurality of service packets, and the second sequence number is a next sequence number of the first sequence number.

In this embodiment of this application, the second network device further receives a second service packet from the VM 3, where the second service packet is one of the plurality of service packets. To be specific, both the first service packet and the second service packet belong to the data flow 01. In an implementation of this application, the second service packet is a next service packet of the first service packet. After the second network device receives the second service packet, the second network device generates the second VXLAN packet based on the second service packet. For an implementation in which the second network device generates the second VXLAN packet, refer to the foregoing implementation in which the second network device generates the first VXLAN packet. Details are not described herein.

The second sequence number carried in the second VXLAN packet is the next sequence number of the first sequence number carried in the first VXLAN packet. That is, the first sequence number and the second sequence number are consecutive sequence numbers. For example, if the value of the first sequence number is 5 and a sequence number step value is 1, a value of the second sequence number is 6. Alternatively, if the value of the first sequence number is 5 and a sequence number step value is 2, a value of the second sequence number is 7.

For example, according to the descriptions of S102, after the second network device generates the first VXLAN packet, the second network device further adds the value of the first current sequence number by the value of the first step. In other words, before generating the next VXLAN packet (for example, the second VXLAN packet) of the first VXLAN packet, the second network device updates the value of the first current sequence number. In addition, a specific value of the first step may be determined through negotiation between the first network device and the second network device. Alternatively, the second network device determines the value of the first step, and notifies the first network device. Alternatively, a network administrator directly sets the value of the first step on the first network device and the second network device. Alternatively, a default value (for example, a default value of the first step is 1) of the first network device and the second network device is directly used. Optionally, a value of a sequence number of the first VXLAN packet of the data flow 01 sent by the second network device is set to the value of the first step.

S107: After the second network device sends the first VXLAN packet to the first network device on the first link, the second network device sends the second VXLAN packet to the first network device on the second link.

S108: The first network device receives the second VXLAN packet sent by the second network device on the second link.

According to the foregoing descriptions of the implementation of this application, the first VXLAN packet includes the first service packet, and the second VXLAN packet includes the second service packet. The first service packet and the second service packet belong to a same data flow, for example, the data flow 01. The first VXLAN packet and the second VXLAN packet are transmitted on different links, so that a plurality of VXLAN packets are sent on the first link and the second link in the per-packet load balancing manner. The first VXLAN packet further includes the first sequence number, and the second VXLAN packet further includes the second sequence number, to ensure that the first network device processes VXLAN packets based on sequence numbers when receiving the different VXLAN packets from a same data flow.

In an application scenario, the second network device generates the plurality of VXLAN packets based on the received plurality of service packets, and sends the plurality of VXLAN packets on the first link and the second link in the per-packet load balancing manner. The following uses FIG. 4 as an example to describe an implementation in which the second network device sends a VXLAN packet. Compared with the network structure shown in FIG. 1, specific implementation of VXLAN packet transmission is added in FIG. 4.

As shown in FIG. 4, a block 1 to a block 4 displayed on the first link and the second link indicate four VXLAN packets, numbers in the blocks indicate sequence numbers of the VXLAN packets, and the four VXLAN packets all belong to the data flow oi. It should be understood that each of the first VXLAN packet and the second VXLAN packet in this embodiment of this application may be any VXLAN packet in the four VXLAN packets shown in FIG. 4. For ease of description, the four VXLAN packets shown in FIG. 4 are respectively referred to as a VXLAN packet 01, a VXLAN packet 02, a VXLAN packet 03, and a VXLAN packet 04. A number in a name corresponds to a corresponding sequence number. In this embodiment of this application, for example, the first step is set to 1, and an initial value of the first current sequence number is 1.

According to the description of the foregoing implementation, after receiving the plurality of service packets, the second network device encapsulates the first service packet in the plurality of service packets into the VXLAN packet 01. The data flow 01 includes the plurality of service packets. The value of the first current sequence number is 1, and therefore a sequence number carried in the VXLAN packet 01 is 1. The second network device determines, through hash calculation, to send the VXLAN packet 01 on the first link. In addition, the second network device increases the first current sequence number by the first step, that is, updates the value of the first current sequence number from 1 to 2. Then, the second network device encapsulates the second service packet in the data flow 01 into the VXLAN packet 02. The value of the first current sequence number has been updated to 2, and therefore a sequence number carried in the VXLAN packet 02 is 2. The second network device determines, through hash calculation, to send the VXLAN packet 02 on the second link. In addition, the value of the first current sequence number continues to be updated from 2 to 3. In same implementations, the second network device sends the VXLAN packet 03 and the VXLAN packet 04 to the first network device. Therefore, the second network device may insert a sequence number into a VXLAN packet, to implement load balancing transmission of service packets in the data flow 01 on different links in the VXLAN tunnel. According to the description of the foregoing implementation, the VXLAN packet may carry a flow identifier, to distinguish different data flows. Therefore, the second network device may simultaneously send different data flows, and sequence numbers of the different data flows may overlap.

S109: After the first network device decapsulates the first VXLAN packet, the first network device determines whether the second sequence number is a next sequence number of the first sequence number.

S110: When the first network device determines that the second sequence number is the next sequence number of the first sequence number, the first network device decapsulates the second VXLAN packet.

To distinguish the current sequence number stored in the second network device, the current sequence number stored in the first network device is referred to as a second current sequence number. After receiving the second VXLAN packet, the first network device obtains the second sequence number carried in the second VXLAN packet. Then, the first network device processes the second VXLAN packet based on the second sequence number and the second current sequence number. The second current sequence number is a sequence number of a VXLAN packet that is in the data flow and that is latest decapsulated by the first network device. The VXLAN packet that is in the data flow and that is latest decapsulated is a previous VXLAN packet that is of the second VXLAN packet and that is received by the first network device. Both the previous VXLAN packet and the second VXLAN packet belong to the data flow 01, and the previous VXLAN packet is successfully decapsulated by the first network device. According to the foregoing implementation of this application, the previous VXLAN packet may be the first VXLAN packet, and the second current sequence number is the first sequence number. Processing, by the first network device, the second VXLAN packet may include: decapsulating the second VXLAN packet, and forwarding the second service packet included in the second VXLAN packet, or caching the second VXLAN packet. Specifically, the first network device determines whether the second sequence number is consecutive to the second current sequence number. In other words, the first network device determines whether the second sequence number is the next sequence number of the first sequence number. Optionally, when the first network device determines that the second sequence number is the next sequence number of the first sequence number, the first network device decapsulates the second VXLAN packet, and forwards a decapsulated second service packet to the destination end. When determining that the second sequence number is not the next sequence number of the first sequence number, the first network device caches the second VXLAN packet into a memory of the first network device.

FIG. 4 is still used as an example for description. It is assumed that an initial value of the second current sequence number is 0, and the value of the first step is 1. It is assumed that the first network device first receives the VXLAN packet 01. The first network device determines that the sequence number of the VXLAN packet 01 is 1, and the first network device determines that a value of the second current sequence number is 0. Therefore, the first network device may determine that the sequence number of the VXLAN packet 01 is consecutive to the second current sequence number. The first network device decapsulates the VXLAN packet 01 based on a determining result, and forwards a service packet included in the VXLAN packet 01. In this way, the first network device may determine that the VXLAN packet 01 is a VXLAN packet that is in the data flow 01 and that is latest decapsulated. Therefore, the first network device updates the second current sequence number to a value of the sequence number of the VXLAN packet 01. If the next VXLAN packet received by the first network device is the VXLAN packet 02, the first network device may process the VXLAN packet 02 in a same processing manner.

It is assumed that after the VXLAN packet 01 is received, the next VXLAN packet received by the first network device is the VXLAN packet 03. The first network device determines that a sequence number of the VXLAN packet 03 is 3, and the first network device determines that the value of the second current sequence number is 1. Therefore, the first network device may determine that the sequence number of the VXLAN packet 03 is not consecutive to the second current sequence number. In other words, the sequence number of VXLAN packet 03 is not the next sequence number of the sequence number of the VXLAN packet 01. The first network device caches the VXLAN packet 03 based on a determining result. In addition, the VXLAN packet 03 is not the VXLAN packet that is in the data flow 01 and that is latest decapsulated by the first network device. Therefore, the first network device does not update the second current sequence number to a value of the sequence number of the VXLAN packet 03. Optionally, after the first network device receives the VXLAN packet 02 and successfully decapsulates the VXLAN packet 02, the first network device decapsulates the cached VXLAN packet 03.

According to the description of the foregoing implementation, when receiving VXLAN packets of different data flows, the first network device may identify, based on flow identifiers, data flows to which the VXLAN packets belong, to process a plurality of data flows according to the foregoing method.

A plurality of links included in the VXLAN tunnel may be referred to as equal-cost multi-path (ECMP) links. The ECMP may also be expressed as equal cost multi-path. As shown in FIG. 1, the ECMP links include the first link and the second link.

According to the data traffic processing method provided in this embodiment, the second network device transmits a plurality of VXLAN packets to the first network device on the plurality of links included in the VXLAN tunnel in the per-packet load balancing manner, and loads carried in the plurality of VXLAN packets belong to a same data flow. Each of the plurality of VXLAN packets includes a sequence number. Correspondingly, after receiving a VXLAN packet sent by the second network device, the first network device processes the VXLAN packet based on a sequence number carried in the VXLAN packet and a current sequence number stored in the first network device. According to the method provided in this embodiment, the sequence number is applied to transmission of the VXLAN packet, so that data traffic is transmitted through the VXLAN tunnel in the ordered per-packet load balancing manner. This reduces packet disorder and increases bandwidth utilization of the VXLAN tunnel.

Optionally, when the first network device determines that the second sequence number is not the next sequence number of the first sequence number in the first VXLAN packet that has been decapsulated by the first network device, the first network device stores the second VXLAN packet in the memory.

With reference to the foregoing implementation, for example, a specific implementation in which the first network device determines whether the second sequence number and the second current sequence number are consecutive is as follows: The first network device determines whether a result obtained by subtracting the value of the second current sequence number from the value of the second sequence number is equal to the first step. When the result is equal to the first step, the first network device may decapsulate the second VXLAN packet and update the value of the second current sequence number to the value of the second sequence number according to the implementation of S110. When the result is not equal to the first step, the first network device may store the second VXLAN packet in the memory.

For example, as shown in FIG. 4, after receiving the VXLAN packet 01, the first network device determines that a result obtained by subtracting the value (the value is 0) of the second current sequence number from the value (the value is 1) of the sequence number of the VXLAN packet 01 is equal to the first step (the value is 1). Therefore, the first network device decapsulates the VXLAN packet 01 and updates the value of the second current sequence number to the value of the sequence number of the VXLAN packet 01. Then, the first network device receives the VXLAN packet 03. The first network device determines that a result obtained by subtracting the value (the value is 1) of the second current sequence number from the value (the value is 3) of the sequence number of the VXLAN packet 03 is not equal to the first step (the value is 1). Therefore, the first network device stores the VXLAN packet 03 in the memory.

Optionally, the first network device determines whether the memory stores a third VXLAN packet. The third VXLAN packet is a VXLAN packet received by the first network device on the first link or the second link, and the third VXLAN packet includes a third sequence number and a third service packet. The third sequence number indicates a location of the third service packet in the plurality of service packets, and the third sequence number is a next sequence number of the first sequence number in the first VXLAN packet that has been decapsulated by the first network device, or the third sequence number is a next sequence number of the second sequence number in the second VXLAN packet that has been decapsulated by the first network device. When the first network device determines that the memory stores the third VXLAN packet, the first network device decapsulates the third VXLAN packet.

According to the description of the foregoing implementation, the first network device determines, based on a sequence number of a received VXLAN packet and the second current sequence number, whether the received VXLAN packet is a consecutive packet of the VXLAN packet that has been decapsulated by the first network device. When the VXLAN packet received by the first network device is not the consecutive packet, the first network device caches the received VXLAN packet into the memory. Therefore, the memory may cache one or more inconsecutive VXLAN packets. In an implementation, it is assumed that the first network device has decapsulated the second VXALN packet. In other words, when the VXLAN packet that has been latest decapsulated by the first network device is the second VXLAN packet, the first network device searches the memory after decapsulating the second VXLAN packet and updating the value of the second current sequence number, so that the first network device determines whether the third VXLAN packet exists in the memory. A result obtained by subtracting the value of the second current sequence number from a value of the third sequence number carried in the third VXLAN packet is equal to the first step. To be specific, the first network device determines whether the third VXLAN packet consecutive to the currently decapsulated second VXLAN packet exists in the memory. If the third VXLAN packet exists in the memory, the first network device decapsulates the third VXLAN packet and updates the value of the current sequence number to the value of the third sequence number. Further, optionally, after decapsulating the third VXLAN packet, the first network device may further continue to determine, according to the foregoing implementation, whether a fourth VXLAN packet consecutive to the third VXLAN packet exists in the memory. If the fourth VXLAN packet exists in the memory, the first network device decapsulates the fourth VXLAN packet and updates the value of the current sequence number to a value of the fourth sequence number.

In another implementation, it is assumed that the first network device has decapsulated the first VXALN packet. In other words, when the VXLAN packet that has been latest decapsulated by the first network device is the first VXLAN packet, the value of the second current sequence number is the value of the first sequence number. The first network device determines whether the third VXLAN packet exists in the memory. The result obtained by subtracting the value of the second current sequence number from the value of the third sequence number carried in the third VXLAN packet is equal to the first step. To be specific, the first network device determines whether the third VXLAN packet consecutive to the currently decapsulated first VXLAN packet exists in the memory. If the third VXLAN packet exists in the memory, the first network device decapsulates the third VXLAN packet and updates the value of the current sequence number to the value of the third sequence number.

For example, as shown in FIG. 4, it is assumed that the first network device receives the VXLAN packet 01 and completes processing of the VXLAN packet 01 according to the description of the foregoing implementation. Then, the first network device successively receives the VXLAN packet 03 and the VXLAN packet 04. According to the description of the foregoing implementation, the VXLAN packet 03 and the VXLAN packet 04 are cached in the memory. Then, the first network device receives the VXLAN packet 02, and the first network device completes processing of the VXLAN packet 02 according to the description of the foregoing implementation. In this way, the value of the second current sequence number is updated to 2. The first network device determines that the VXLAN packet 03 exists in the memory, and the result obtained by subtracting the value (the value is 2) of the second current sequence number from the value (the value is 3) of the sequence number of the VXLAN packet 03 is equal to the first step (the value is 1). The first network device decapsulates the VXLAN packet 03 and updates the value of the second current sequence number to the value of the sequence number of the VXLAN packet 03. In a same implementation, the first network device may continue to process the VXLAN packet 04 in the memory.

In a possible implementation, the first network device may be configured to: when determining that the value of the second current sequence number is updated, perform an operation of searching for the third VXLAN packet.

According to the foregoing implementation, the first network device may cache an inconsecutive VXLAN packet to the memory, and when detecting a VXLAN packet consecutive to the VXLAN packet cached in the memory, the first network device decapsulates the VXLAN packet cached in the memory. This further reduces packet disorder.

Optionally, when residence time of a fourth VXLAN packet in the memory is greater than or equal to a first time threshold, the first network device determines whether a value of a fourth sequence number is less than a value of a sequence number included in another VXLAN packet stored in the memory, and the first network device determines whether the value of the fourth sequence number is greater than a value of the first sequence number in the first VXLAN packet that has been decapsulated by the first network device. The fourth VXLAN packet is a VXLAN packet received by the first network device on the first link or the second link, the fourth VXLAN packet includes the fourth sequence number and a fourth service packet, and the fourth sequence number indicates a location of the fourth service packet in the plurality of service packets. When the first network device determines that the value of the fourth sequence number is less than the value of the sequence number included in the another VXLAN packet stored in the memory, and the value of the fourth sequence number is greater than a the value of the first sequence number in the first VXLAN packet that has been decapsulated by the first network device, the first network device decapsulates the fourth VXLAN packet.

If a packet loss has occurred in a previous consecutive packet of the fourth VXLAN packet on a transmission path, the first network device cannot receive the previous consecutive packet of the fourth VXLAN packet, and the fourth VXLAN packet cannot always be a consecutive packet of a VXLAN packet that has been latest decapsulated by the first network device. As a result, packet transmission is interrupted. To avoid packet transmission interruption caused by the packet loss, the first network device may further include a first timer. The first timer is configured to record the residence time of the fourth VXLAN packet entering the memory, and the residence time is referred to as a first cache time. When the fourth VXLAN packet enters the memory, the first timer starts to time. The first network device further includes the first time threshold. If the first cache time exceeds the first time threshold, and the first network device determines that the fourth sequence number of the fourth VXLAN packet is a smallest sequence number in the memory and that the value of the fourth sequence number is greater than the value of the second current sequence number, the first network device forcibly decapsulates the fourth VXLAN packet, and updates the value of the second current sequence number. Optionally, when the VXLAN packet that has been latest decapsulated by the first network device is the first VXLAN packet, the value of the second current sequence number is the value of the first sequence number. When the VXLAN packet that has been latest decapsulated by the first network device is the second VXLAN packet, the value of the second current sequence number is the value of the second sequence number. When the VXLAN packet that has been latest decapsulated by the first network device is the third VXLAN packet, the value of the second current sequence number is the value of the third sequence number.

For example, as shown in FIG. 4, after receiving the VXLAN packet 01, the first network device receives the VXLAN packet 03 and the VXLAN packet 04. According to the description of the foregoing implementation, the VXLAN packet 03 and the VXLAN packet 04 are cached in the memory. Assuming that a packet loss occurs in a transmission process of the VXLAN packet 02, the first network device cannot receive the VXLAN packet 02. In this case, the first network device has decapsulated the VXLAN packet 01, and updated the value of the second current sequence number to 1. According to an implementation of the foregoing implementation, the first network device cannot find, in the memory, a sequence number whose value is greater than the value of the second current sequence number by the first step (the value is 1). When a cache time of the VXLAN packet 03 exceeds the first time threshold, and the first network device may determine that the sequence number of the VXLAN packet 03 is the smallest sequence number in the memory and the value (the value is 3) of the sequence number of the VXLAN packet 03 is greater than the value (the value is 1) of the second current sequence number, the first network device decapsulates the VXLAN packet 03 and updates the value of the second current sequence number to the value of the sequence number of the VXLAN packet 03.

According to the foregoing implementation, it is ensured that service interruption is not caused by a packet loss on a link in the VXLAN tunnel during data flow transmission between the first network device and the second network device.

Optionally, when residence time of a fourth VXLAN packet in the memory is greater than or equal to a first time threshold, the first network device determines whether a value of a fourth sequence number is greater than a value of a sequence number included in another VXLAN packet stored in the memory. The fourth VXLAN packet is a VXLAN packet received by the first network device on the first link or the second link, the fourth VXLAN packet includes the fourth sequence number and a fourth service packet, and the fourth sequence number indicates a location of the fourth service packet in the plurality of service packets. When the first network device determines that the value of the fourth sequence number is greater than the value of the sequence number included in the another VXLAN packet stored in the memory, the first network device resets the residence time of the fourth VXLAN packet in the memory, and re-counts the residence time of the fourth VXLAN packet in the memory.

For example, as shown in FIG. 4, after the first network device receives the VXLAN packet 01, the first network device receives the VXLAN packet 04 before receiving the VXLAN packet 03. According to the description of the foregoing implementation, the VXLAN packet 03 and the VXLAN packet 04 are cached in the memory. Assuming that a packet loss occurs in a transmission process of the VXLAN packet 02, the first network device cannot receive the VXLAN packet 02. In this way, a cache time of the VXLAN packet 04 exceeds the time threshold earlier than the cache time of the VXLAN packet 03. The first network device determines that a sequence number of the VXLAN packet 04 is not the smallest sequence number in the memory, and the first network device resets the cache time of the VXLAN packet 04 to 0. In this way, the cache time of the VXLAN packet 04 is recounted, to ensure that the cache time of the VXLAN packet 03 first exceeds the time threshold. Therefore, the first network device can decapsulate the VXLAN packet 03 before decapsulating the VXLAN packet 04, to further reduce disorder.

Optionally, when residence time of a fourth VXLAN packet in the memory is greater than or equal to a first time threshold, the first network device determines whether a value of a fourth sequence number is less than a value of a sequence number included in another VXLAN packet stored in the memory, and the first network device determines whether an absolute value of a difference between the value of the fourth sequence number and a value of a sequence number in a VXLAN packet that has been latest decapsulated by the first network device is greater than a first sequence number threshold. The fourth VXLAN packet is a VXLAN packet received by the first network device on the first link or the second link, the fourth VXLAN packet includes the fourth sequence number and a fourth service packet, the fourth sequence number indicates a location of the fourth service packet in the plurality of service packets, and a range of the first sequence number threshold is [0.5N, N], where N indicates an upper limit value of a sequence number in a VXLAN packet sent by the second network device. When the first network device determines that the value of the fourth sequence number is less than the value of the sequence number included in the another VXLAN packet stored in the memory, and the absolute value of the difference between the value of the fourth sequence number and the value of the sequence number in the VXLAN packet that has been latest decapsulated by the first network device is greater than the first sequence number threshold, the first network device decapsulates the fourth VXLAN packet.

Generally, in this embodiment of this application, an upper limit value of a sequence number that can be carried in a VXLAN packet is greater than a quantity of service packets included in a transmitted data flow. For example, a quantity of service packets included in the data flow 01 is 5000000, and the upper limit value of the sequence number is FFFFFF (hexadecimal). In a possible implementation, the data amount of the data flow 01 may be relatively large, and consequently the quantity of service packets included in the data flow 01 exceeds the upper limit value (for example, FFFFFF) of the sequence number that can be carried in the VXLAN packet. In this way, in a process in which the second network device sends the VXLAN packet of the data flow 01, it is assumed that the value of the first current sequence number is FFFFFF. Before sending a next VXLAN packet of the data flow 01, the second network device adds the first step (the value is 1) to the value (FFFFFF) of the first current sequence number, and the value of the first current sequence number is updated to 0 (a total of 24 bits calculated in a binary mode). This is called sequence number reversion. To be specific, a sequence number is recounted after being updated to a maximum value.

Correspondingly, on a first network device side, it is assumed that the value of the second current sequence number is FFFFFF, and a reversion threshold is FFFFFF. Because the sequence number reaches the upper limit value, the first network device cannot find a packet whose sequence number is greater than FFFFFF in the memory. The first network device further receives the fourth VXLAN packet. It is assumed that the fourth sequence number of the fourth VXLAN packet is 0 (according to the foregoing description, the fourth sequence number is a reversed sequence number). When the fourth VXLAN packet times out in the memory, the first network device determines that a value obtained by subtracting the value (the value is FFFFFF) of the second current sequence number from the value (the value is 0) of the fourth sequence number is −FFFFFF, and an absolute value of the value is FFFFFF. The first network device determines that a calculation result is equal to the reversion threshold FFFFFF. Therefore, the first network device may determine that the fourth VXLAN packet is a consecutive VXLAN packet, and the first network device decapsulates the fourth VXLAN packet and updates the value of the second current sequence number to the value of the fourth sequence number.

According to the foregoing implementation, the VXLAN tunnel between the first network device and the second network device may reduce disorder when data flows with a large data amount (which may be referred to as an "elephant flow") are transmitted. In actual application, a set value of the reversion threshold may be less than the upper limit value of the sequence number. As long as it is ensured that the set value of the reversion threshold indicates, on an order of magnitude, that the used sequence number reaches the upper limit value. For example, if the reversion threshold is set to FFFFFD, a reversed VXLAN packet can still be normally decapsulated even if a packet loss occurs in a VXLAN packet whose sequence number is FFFFFD. In the foregoing implementation, the range of the first sequence number threshold is [0.5N, N], where N indicates an upper limit value of a sequence number in a VXLAN packet sent by the second network device. Such a setting helps increase tolerance of the first network device when the first network device determines to perform reversion.

In a possible implementation, the VXLAN packet may include a reverse flag bit, and the reverse flag bit is used to indicate whether a sequence number carried in a VXLAN packet is reversed. For example, when the sequence number is reversed, the second network device sets the reverse flag bit from 0 to 1. When the sequence number is reversed again, the second network device sets the reverse flag bit from 1 to 0. In this way, the second network device used as a receive end may determine, based on the reverse flag bit, that the last VXLAN packet (which may be referred to as a tail packet) before reversion and the first reversed VXLAN packet (which may be referred to as an initial packet) are mutually consecutive VXLAN packets.

In a possible implementation, the first network device may further include a second timer, and the second timer is configured to record a total cache time of the VXLAN packets in the memory. In this way, even if the cache time recorded by using the first timer is reset, the total cache time recorded by using the second timer is not reset. When the first network device determines that the total cache time reaches the first time threshold, the first network device discards the VXLAN packets corresponding to the total cache time. An objective of such a setting is to prevent an individual VXLAN packet that cannot be decapsulated from occupying storage space of the memory for a long time due to a packet transmission error or an error in processing by the first network device.

In this embodiment of this application, the space of the memory may be set based on a network status. For example, performance of the plurality of links in the VXLAN tunnel is relatively good, and the space of the memory may be set to be relatively small. The performance may include a delay, a packet loss rate, and a jitter of a link. When the first network device determines that occupancy of the memory reaches 100%, the first network device may forcibly decapsulate a packet in the memory according to a sequence of sequence numbers of VXLAN packets cached in the memory, and update the second current sequence number.

Figure 8:
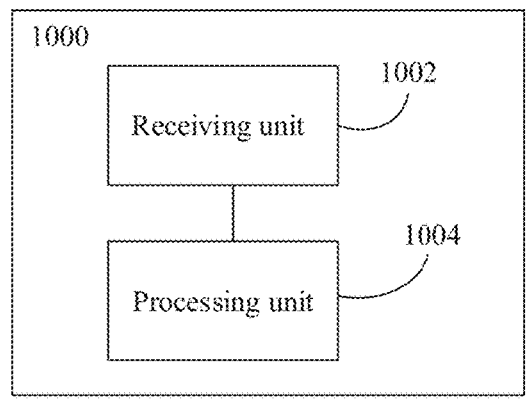
FIG. 8 is a schematic structural diagram of a first network device according to an embodiment of this application.

FIG. 8 is a schematic structural diagram of a first network device 1000 according to an embodiment of this application. The first network device 1000 shown in FIG. 8 may perform corresponding steps performed by the first network device in the method in the foregoing embodiment. The first network device is deployed in a VXLAN, and the VXLAN further includes a second network device. The first network device is connected to the second network device through a VXLAN tunnel, and the VXLAN tunnel includes a first link and a second link. As shown in FIG. 8, the first network device 1000 includes a receiving unit 1002 and a processing unit 1004.

The receiving unit 1002 is configured to receive, on the first link, a first VXLAN packet sent by the second network device, where the first VXLAN packet includes a first sequence number and a first service packet, and the first sequence number indicates a location of the first service packet in a plurality of service packets.

The processing unit 1004 is configured to decapsulate the first VXLAN packet.

The receiving unit 1002 is further configured to receive, on the second link, a second VXLAN packet sent by the second network device, where the second VXLAN packet includes a second sequence number and a second service packet, and the second sequence number indicates a location of the second service packet in the plurality of service packets.

After the processing unit 1004 decapsulates the first VXLAN packet, the processing unit 1004 is further configured to determine whether the second sequence number is a next sequence number of the first sequence number.

When the processing unit 1004 determines that the second sequence number is the next sequence number of the first sequence number, the processing unit 1004 is further configured to decapsulate the second VXLAN packet.

Optionally, when the processing unit 1004 determines that the second sequence number is not the next sequence number of the first sequence number in the first VXLAN packet that has been decapsulated by the processing unit 1004, the processing unit 1004 is further configured to store the second VXLAN packet in a memory.

Optionally, the processing unit 1004 is further configured to determine whether the memory stores a third VXLAN packet, where the third VXLAN packet is a VXLAN packet received by the receiving unit 1002 on the first link or the second link, the third VXLAN packet includes a third sequence number and a third service packet, the third sequence number indicates a location of the third service packet in the plurality of service packets, and the third sequence number is a next sequence number of the first sequence number in the first VXLAN packet that has been decapsulated by the processing unit 1004. When the processing unit 1004 determines that the memory stores the third VXLAN packet, the processing unit 1004 is further configured to decapsulate the third VXLAN packet.

Optionally, when residence time of a fourth VXLAN packet in the memory is greater than or equal to a first time threshold, the processing unit 1004 is further configured to determine whether a value of a fourth sequence number is less than a value of a sequence number included in another VXLAN packet stored in the memory, and the processing unit 1004 is further configured to determine whether the value of the fourth sequence number is greater than a value of the first sequence number in the first VXLAN packet that has been decapsulated by the processing unit 1004. The fourth VXLAN packet is a VXLAN packet received by the receiving unit 1002 on the first link or the second link, the fourth VXLAN packet includes the fourth sequence number and a fourth service packet, and the fourth sequence number indicates a location of the fourth service packet in the plurality of service packets. When the processing unit 1004 determines that the value of the fourth sequence number is less than the value of the sequence number included in the another VXLAN packet stored in the memory, and the value of the fourth sequence number is greater than the value of the first sequence number in the first VXLAN packet that has been decapsulated by the processing unit 1004, the processing unit 1004 is further configured to decapsulate the fourth VXLAN packet.

Optionally, when residence time of a fourth VXLAN packet in the memory is greater than or equal to a first time threshold, the processing unit 1004 is further configured to determine whether a value of a fourth sequence number is greater than a value of a sequence number included in another VXLAN packet stored in the memory. The fourth VXLAN packet is a VXLAN packet received by the receiving unit 1002 on the first link or the second link, the fourth VXLAN packet includes the fourth sequence number and a fourth service packet, and the fourth sequence number indicates a location of the fourth service packet in the plurality of service packets. When the processing unit 1004 determines that the value of the fourth sequence number is greater than the value of the sequence number included in the another VXLAN packet stored in the memory, the processing unit 1004 is further configured to: reset the residence time of the fourth VXLAN packet in the memory, and re-count the residence time of the fourth VXLAN packet in the memory.

Optionally, when residence time of a fourth VXLAN packet in the memory is greater than or equal to a first time threshold, the processing unit 1004 is further configured to determine whether a value of a fourth sequence number is less than a value of a sequence number included in another VXLAN packet stored in the memory, and the processing unit 1004 is further configured to determine whether an absolute value of a difference between the value of the fourth sequence number and a value of the first sequence number in the first VXLAN packet that has been decapsulated by the processing unit 1004 is greater than a first sequence number threshold. The fourth VXLAN packet is a VXLAN packet received by the receiving unit 1002 on the first link or the second link, the fourth VXLAN packet includes the fourth sequence number and a fourth service packet, the fourth sequence number indicates a location of the fourth service packet in the plurality of service packets, and a range of the first sequence number threshold is [0.5N, N], where N indicates an upper limit value of a sequence number in a VXLAN packet sent by the second network device. When the processing unit 1004 determines that the value of the fourth sequence number is less than the value of the sequence number included in the another VXLAN packet stored in the memory, and the absolute value of the difference between the value of the fourth sequence number and the value of the first sequence number in the first VXLAN packet that has been decapsulated by the processing unit 1004 is greater than the first sequence number threshold, the processing unit 1004 is further configured to decapsulate the fourth VXLAN packet.

Optionally, the first VXLAN packet further includes an identifier of a first data flow, and the first data flow includes the plurality of service packets.

The first network device 1000 shown in FIG. 8 may perform the corresponding steps performed by the first network device in the method in the foregoing embodiment. The first network device is applied to a VXLAN scenario. The second network device transmits a plurality of VXLAN packets to the first network device on a plurality of links included in the VXLAN tunnel in a per-packet load balancing manner, and loads carried in the plurality of VXLAN packets belong to a same data flow. Each of the plurality of VXLAN packets includes a sequence number. Correspondingly, after receiving a VXLAN packet sent by the second network device, the first network device processes the VXLAN packet based on a sequence number carried in the VXLAN packet and a current sequence number stored in the first network device. According to the device provided in this embodiment, the sequence number is applied to transmission of the VXLAN packet, so that data traffic is transmitted through the VXLAN tunnel in an ordered per-packet load balancing manner. This reduces packet disorder and increases bandwidth utilization of the VXLAN tunnel.

Figure 9:
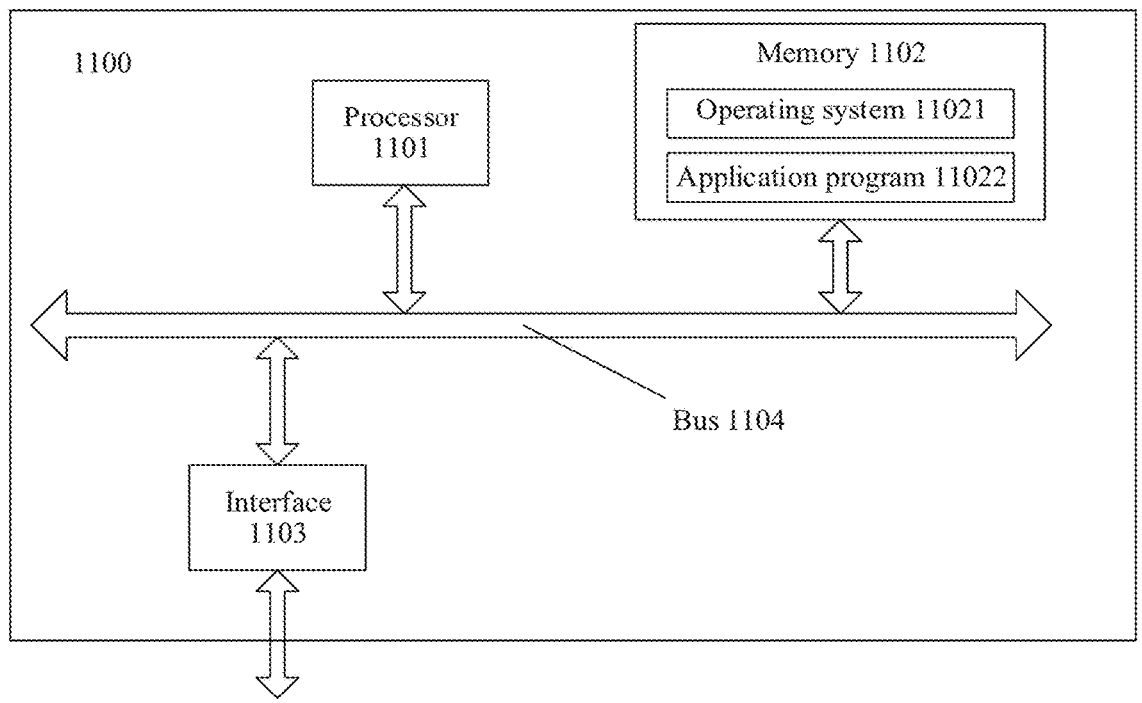
FIG. 9 is a schematic diagram of a hardware structure of a first network device according to an embodiment of this application.

FIG. 9 is a schematic diagram of a hardware structure of a first network device 1100 according to an embodiment of this application. The first network device 1100 shown in FIG. 9 may perform corresponding steps performed by the first network device in the method in the foregoing embodiment.

As shown in FIG. 9, the first network device 1100 includes a processor 1101, a memory 1102, an interface 1103, and a bus 1104. The interface 1103 may be implemented in a wireless or wired manner, and may be specifically a network adapter. The processor 1101, the memory 1102, and the interface 1103 are connected by using the bus 1104.

The interface 1103 may specifically include a transmitter and a receiver, and is configured by the first network device to receive information from and send information to the second network device in the foregoing embodiment. For example, the interface 1103 is configured to support receiving of a VXLAN packet sent by the second network device. For example, the interface 1103 is configured to support the processes S104 and S108 in FIG. 3. The processor 1101 is configured to perform processing performed by the first network device in the foregoing embodiment. For example, the processor 1101 is configured to: decapsulate a VXLAN packet; determine whether sequence numbers included in VXLAN packets are consecutive; and/or support another process used for the technology described in this specification. For example, the processor 1101 is configured to support the processes S105, S109 and S110 in FIG. 3. The memory 1102 includes an operating system 11021 and an application program 11022, and is configured to store a program, code, or an instruction. When executing the program, code, or instruction, the processor or a hardware device may complete a processing process of the first network device in the foregoing method embodiment. Optionally, the memory 1102 may include a read-only memory (ROM) and a random access memory (RAM). The ROM includes a basic input/output system (BIOS) or an embedded system, and the RAM includes an application program and an operating system. When the first network device 1100 needs to run, a bootloader in the BIOS or the embedded system that is built into the ROM is used to boot a system to start, and boot the first network device 1100 to enter a normal running state. After entering the normal running state, the first network device 1100 runs the application program and the operating system in the RAM, to complete the processing processes of the first network device in the method embodiment.

It may be understood that FIG. 9 shows only a simplified design of the first network device 1100. In actual application, the first network device may include any quantity of interfaces, processors, or memories.

Figure 10:
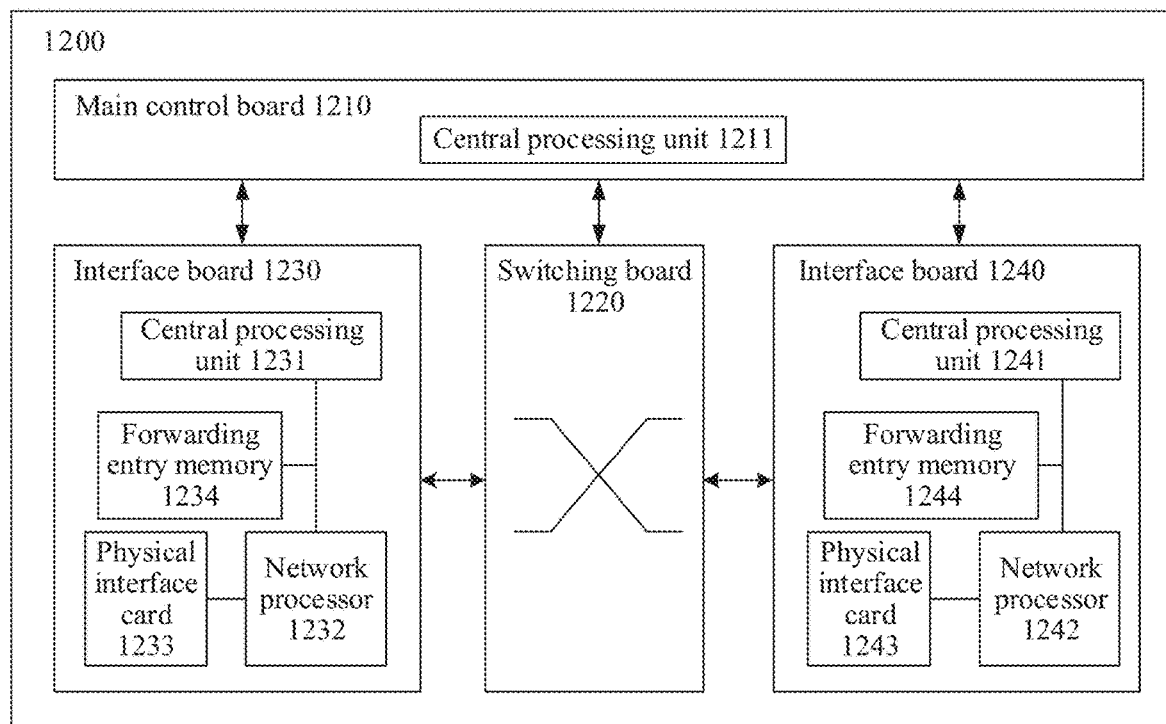
FIG. 10 is a schematic diagram of a hardware structure of another first network device according to an embodiment of this application.

FIG. 10 is a schematic diagram of a hardware structure of another first network device 1200 according to an embodiment of this application. The first network device 1200 shown in FIG. 10 may perform corresponding steps performed by the first network device in the method in the foregoing embodiment.

As shown in FIG. 10, the first network device 1200 includes a main control board 1210, an interface board 1230, a switching board 1220, and an interface board 1240. The main control board 1210, the interface boards 1230 and 1240, and the switching board 1220 are connected to a system backboard by using a system bus for communication. The main control board 1210 is configured to complete functions such as system management, device maintenance, and protocol processing. The switching board 1220 is configured to complete data exchange between interface boards (the interface board is also referred to as a line card or a service board). The interface boards 1230 and 1240 are configured to provide various service interfaces (for example, a POS interface, a GE interface, and an ATM interface), and forward a data packet.

The interface board 1230 may include a central processing unit 1231, a forwarding entry memory 1234, a physical interface card 1233, and a network processor 1232. The central processing unit 1231 is configured to control and manage the interface board, and communicate with the central processing unit on the main control board. The forwarding entry memory 1234 is configured to store a forwarding entry. The physical interface card 1233 is configured to receive and send traffic. The network processor 1232 is configured to control, based on the forwarding entry, the physical interface card 1233 to receive and send the traffic.

Specifically, the physical interface card 1233 is configured to receive a VXLAN packet sent by the second network device.

The central processing unit 1231 is configured to decapsulate the VXLAN packet.

The central processing unit 1231 is further configured to determine whether sequence numbers included in VXLAN packets are consecutive.

After receiving the VXLAN packet, the physical interface card 1233 sends the VXLAN packet to the central processing unit 1231 by using the central processing unit 1231, and the central processing unit 1231 processes the VXLAN packet.

The central processing unit 1231 is further configured to control the network processor 1232 to obtain the forwarding entry in the forwarding entry memory 1234, and the central processing unit 1231 is further configured to control the network processor 1232 to send and receive the traffic by using the physical interface card 1233.

It should be understood that operations on the interface board 1240 are the same as the operations on the interface board 1230 in this embodiment of the present application. For brevity, details are not described. It should be understood that the first network device 1200 in this embodiment may correspond to the functions and/or the various implemented steps in the foregoing method embodiment. Details are not described herein.

In addition, it should be noted that there may be one main control board or a plurality of main control boards. When there are the plurality of main control boards, a primary main control board and a secondary main control board may be included. There may be one or more interface boards, and a first network device having a stronger data processing capability provides more interface boards. There may also be one or more physical interface cards on the interface board. There may be no switching board or one switching board or a plurality of switching boards. When there are the plurality of switching boards, load sharing and redundancy backup may be implemented together. In a centralized forwarding architecture, the first network device may need no switching board, and the interface board provides a function of processing service data of an entire system. In a distributed forwarding architecture, the first network device may have at least one switching board, and data exchange between a plurality of interface boards is performed by using the switching board, to provide large-capacity data exchange and a processing capability. Therefore, data access and a processing capability of the first network device in the distributed architecture is better than data access and a processing capability of the first network device in the centralized architecture. Which architecture is specifically used depends on a specific networking deployment scenario, and this is not limited herein.

Figure 11:
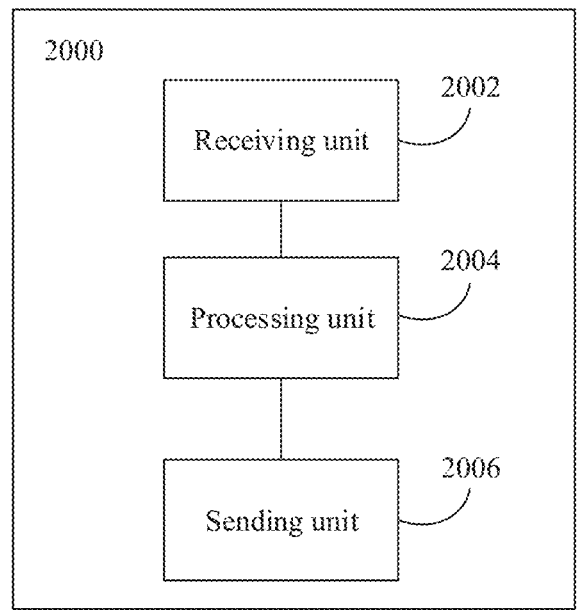
FIG. 11 is a schematic structural diagram of a second network device according to an embodiment of this application.

FIG. 11 is a schematic structural diagram of a second network device 2000 according to an embodiment of this application. The second network device 2000 shown in FIG. 11 may perform corresponding steps performed by the second network device in the method in the foregoing embodiment. The second network device is deployed in a VXLAN, and the VXLAN further includes a first network device. The first network device is connected to the second network device through a VXLAN tunnel, and the VXLAN tunnel includes a first link and a second link. As shown in FIG. 11, the second network device 2000 includes a receiving unit 2002, a processing unit 2004, and a sending unit 2006.

The receiving unit 2002 is configured to receive a plurality of service packets from a virtual machine VM, where the plurality of service packets include a first service packet and a second service packet.

The processing unit 2004 is configured to generate a first VXLAN packet based on the first service packet, where the first VXLAN packet includes a first sequence number and the first service packet, and the first sequence number indicates a location of the first service packet in the plurality of service packets.

The sending unit 2006 is configured to send the first VXLAN packet to the first network device on the first link.

The processing unit 2004 is further configured to generate a second VXLAN packet based on the second service packet, where the second VXLAN packet includes a second sequence number and the second service packet, the second sequence number indicates a location of the second service packet in the plurality of service packets, and the second sequence number is a next sequence number of the first sequence number.

After the sending unit 2006 sends the first VXLAN packet to the first network device on the first link, the sending unit 2006 is further configured to send the second VXLAN packet to the first network device on the second link.

Optionally, the first VXLAN packet includes a VXLAN header, and the VXLAN header includes the first sequence number.

Optionally, the first VXLAN packet includes a generic network virtualization encapsulation GENEVE header, the GENEVE header includes a sequence number type-length-value TLV, and the sequence number TLV includes the first sequence number.

Optionally, the first VXLAN packet further includes an identifier of a first data flow, and the first data flow includes the plurality of service packets.

The second network device shown in FIG. 11 may perform the corresponding steps performed by the second network device in the method in the foregoing embodiment. The second network device is applied to a VXLAN scenario. The second network device transmits a plurality of VXLAN packets to the first network device on a plurality of links included in the VXLAN tunnel in a per-packet load balancing manner, and loads carried in the plurality of VXLAN packets belong to a same data flow. Each of the plurality of VXLAN packets includes a sequence number. Correspondingly, after receiving a VXLAN packet sent by the second network device, the first network device processes the VXLAN packet based on a sequence number carried in the VXLAN packet and a current sequence number stored in the first network device. According to the device provided in this embodiment, the sequence number is applied to transmission of the VXLAN packet, so that data traffic is transmitted through the VXLAN tunnel in an ordered per-packet load balancing manner. This reduces packet disorder and increases bandwidth utilization of the VXLAN tunnel.

Figure 12:
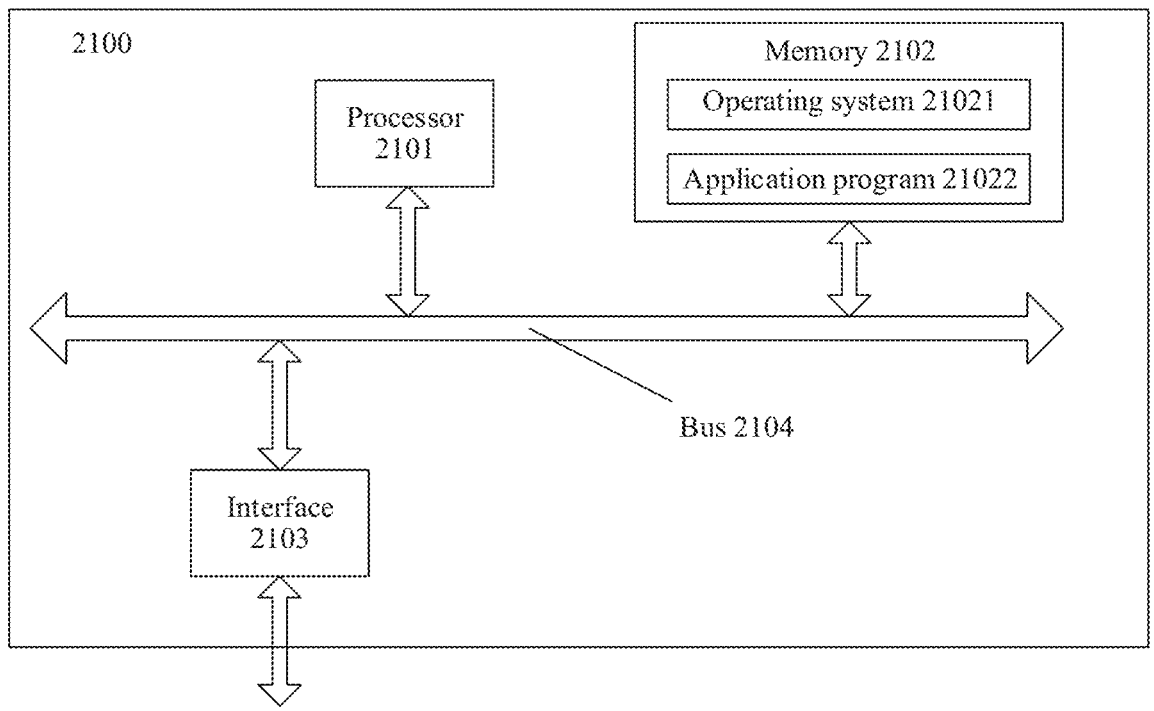
FIG. 12 is a schematic diagram of a hardware structure of a second network device according to an embodiment of this application.

FIG. 12 is a schematic diagram of a hardware structure of a second network device 2100 according to an embodiment of this application. The second network device 2100 shown in FIG. 12 may perform corresponding steps performed by the second network device in the method in the foregoing embodiment.

As shown in FIG. 12, the second network device 2100 includes a processor 2101, a memory 2102, an interface 2103, and a bus 2104. The interface 2103 may be implemented in a wireless or wired manner, and may be specifically a network adapter. The processor 2101, the memory 2102, and the interface 2103 are connected by using the bus 2104.

The interface 2103 may specifically include a transmitter and a receiver, and is configured to send and receive information between the second network device and the first network device in the foregoing embodiment. For example, the interface 2103 is configured to support sending of a VXLAN packet to the first network device, and is further configured to support receiving of a service packet from a VM. For example, the interface 2103 is configured to support the processes S101, S103, and S107 in FIG. 3. The processor 2101 is configured to perform processing performed by the second network device in the foregoing embodiment. For example, the processor 2101 is configured to: encapsulate a VXLAN packet; and/or support another process used for the technology described in this specification. For example, the processor 2101 is configured to support the processes S102 and S106 in FIG. 3. The memory 2102 includes an operating system 21021 and an application program 21022, and is configured to store a program, code, or an instruction. When executing the program, code, or instruction, the processor or a hardware device may complete a processing process of the second network device in the foregoing method embodiment. Optionally, the memory 2102 may include a read-only memory (ROM) and a random access memory (RAM). The ROM includes a basic input/output system (BIOS) or an embedded system, and the RAM includes an application program and an operating system.

When the second network device 2100 needs to run, a bootloader in the BIOS or the embedded system that is built into the ROM is used to boot a system to start, and boot the second network device 2100 to enter a normal running state. After entering the normal running state, the second network device 2100 runs the application program and the operating system in the RAM, to complete the processing process of the second network device in the method embodiment.

It may be understood that FIG. 12 shows only a simplified design of the second network device 2100. In actual application, the second network device may include any quantity of interfaces, processors, or memories.

Figure 13:
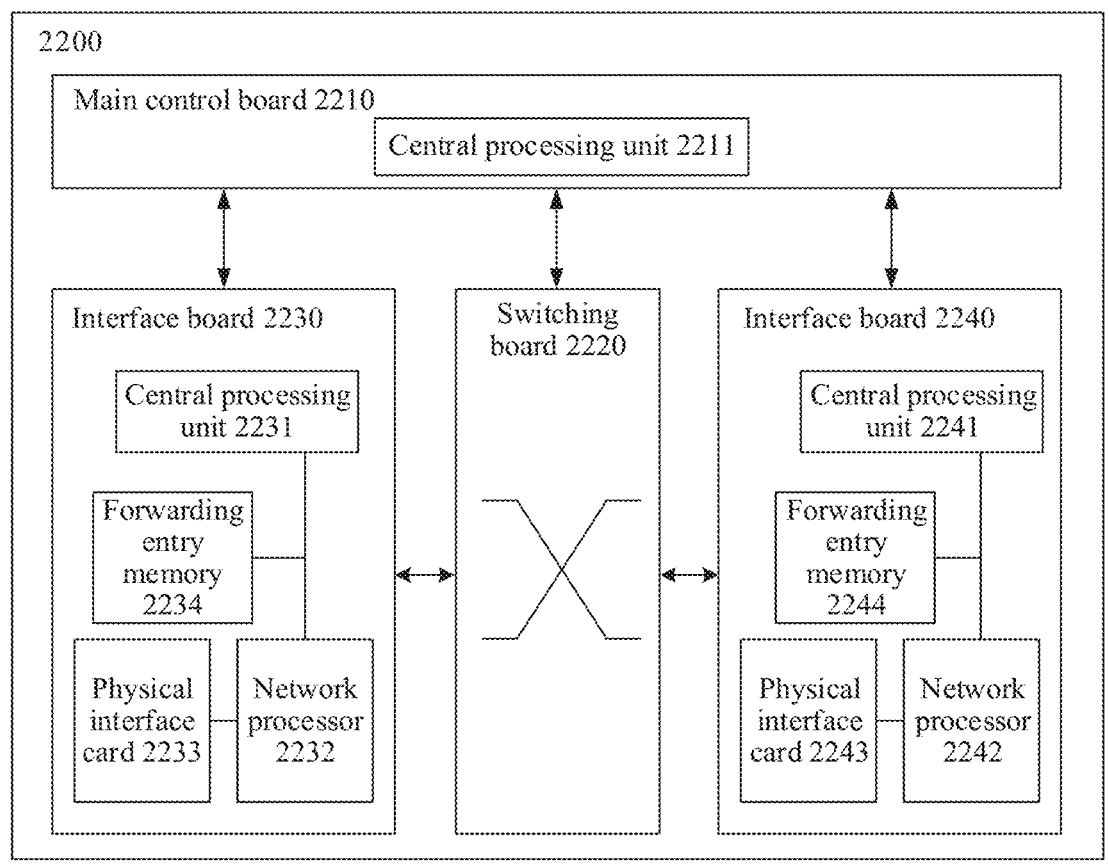
FIG. 13 is a schematic diagram of a hardware structure of another second network device according to an embodiment of this application.

FIG. 13 is a schematic diagram of a hardware structure of another second network device 2200 according to an embodiment of this application. The second network device 2200 shown in FIG. 13 may perform corresponding steps performed by the second network device in the method in the foregoing embodiment.

As shown in FIG. 13, the second network device 2200 includes a main control board 2210, an interface board 2230, a switching board 2220, and an interface board 2240. The main control board 2210, the interface boards 2230 and 2240, and the switching board 2220 are connected to a system backboard by using a system bus for communication. The main control board 2210 is configured to complete functions such as system management, device maintenance, and protocol processing. The switching board 2220 is configured to complete data exchange between interface boards (the interface board is also referred to as a line card or a service board). The interface boards 2230 and 2240 are configured to provide various service interfaces (for example, a POS interface, a GE interface, and an ATM interface), and forward a data packet.

The interface board 2230 may include a central processing unit 2231, a forwarding entry memory 2234, a physical interface card 2233, and a network processor 2232. The central processing unit 2231 is configured to control and manage the interface board, and communicate with the central processing unit on the main control board. The forwarding entry memory 2234 is configured to store a forwarding entry. The physical interface card 2233 is configured to receive and send traffic. The network processor 2232 is configured to control, based on the forwarding entry, the physical interface card 2233 to receive and send the traffic.

Specifically, the physical interface card 2233 is configured to receive a service packet sent by a VM, or is configured to send a VXLAN packet to the first network device.

The central processing unit 2231 is configured to encapsulate a service packet into a VXLAN packet.

The central processing unit 2231 sends the VXLAN packet to the physical interface card 2233 by using the central processing unit 2231. The physical interface card 2233 sends the VXLAN packet to the first network device.

The central processing unit 2231 is further configured to control the network processor 2232 to obtain the forwarding entry in the forwarding entry memory 2234, and the central processing unit 2231 is further configured to control the network processor 2232 to send and receive the traffic by using the physical interface card 2233.

It should be understood that operations on the interface board 2240 are the same as the operations on the interface board 2230 in this embodiment of the present application. For brevity, details are not described. It should be understood that the second network device 2200 in this embodiment may correspond to the functions and/or the various implemented steps in the foregoing method embodiment. Details are not described herein.

In addition, it should be noted that there may be one main control board or a plurality of main control boards. When there are the plurality of main control boards, a primary main control board and a secondary main control board may be included. There may be one or more interface boards, and a second network device having a stronger data processing capability provides more interface boards. There may also be one or more physical interface cards on the interface board. There may be no switching board or one switching board or a plurality of switching boards. When there are the plurality of switching boards, load sharing and redundancy backup may be implemented together. In a centralized forwarding architecture, the second network device may need no switching board, and the interface board provides a function of processing service data of an entire system. In a distributed forwarding architecture, the second network device may have at least one switching board, and data exchange between a plurality of interface boards is performed by using the switching board, to provide large-capacity data exchange and a processing capability. Therefore, data access and a processing capability of the second network device in the distributed architecture is better than data access and a processing capability of the second network device in the centralized architecture. Which architecture is specifically used depends on a specific networking deployment scenario, and this is not limited herein.

In addition, an embodiment of this application provides a computer storage medium, configured to store a computer software instruction used by the foregoing first network device. The computer software instruction includes a program designed for performing the foregoing method embodiment.

In addition, an embodiment of this application provides a computer storage medium, configured to store a computer software instruction used by the foregoing second network device. The computer software instruction includes a program designed for performing the foregoing method embodiment.

An embodiment of this application further includes a network system. The network system includes a first network device and a second network device. The first network device is the first network device in FIG. 8, FIG. 9, or FIG. 10, and the second network device is the second network device in FIG. 11, FIG. 12, or FIG. 13.

Method or algorithm steps described in combination with the content disclosed in this application may be implemented by hardware, or may be implemented by a processor by executing a software instruction. The software instruction may be formed by a corresponding software module. The software module may be stored in a RAM memory, a flash memory, a ROM memory, an EPROM memory, an EEPROM memory, a register, a hard disk, a removable magnetic disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in one or more of the foregoing examples, the functions described in this application may be implemented by hardware or a combination of hardware and software. When this application is implemented by a combination of hardware and software, the software may be stored in a computer-readable medium or transmitted as one or more instructions or one or more pieces of code in the computer-readable medium. The computer-readable medium includes a computer storage medium and a communications medium, where the communications medium includes any medium that enables a computer program to be transmitted from one place to another place. The storage medium may be any available medium accessible to a general-purpose or special-purpose computer.

The objectives, technical solutions, and beneficial effects of this application are further described in detail in the foregoing specific implementations. It should be understood that the foregoing descriptions are merely specific implementations of this application.

What is claimed is:

1. A method comprising:
receiving, by a first network device of a virtual extensible local area network (VXLAN) on a first link, a first VXLAN packet sent by a second network device, the VXLAN comprising the first network device and the second network device, the first network device connected to the second network device through a VXLAN tunnel, and the VXLAN tunnel comprising the first link and a second link, wherein the first VXLAN packet comprises a first sequence number and a first service packet, and the first sequence number indicates a location of the first service packet in a plurality of service packets;
decapsulating, by the first network device, the first VXLAN packet;
receiving, by the first network device on the second link, a second VXLAN packet sent by the second network device, wherein the second VXLAN packet comprises a second sequence number and a second service packet, and the second sequence number indicates a location of the second service packet in the plurality of service packets;
after the first network device decapsulates the first VXLAN packet, determining, by the first network device, whether the second service packet is a next service packet of the first service packet in the plurality of service packets; and
when the first network device determines that the second service packet is the next service packet of the first service packet, decapsulating, by the first network device, the second VXLAN packet; and
wherein the method further comprises:
when the first network device determines that the second service packet is not the next service packet of the first service packet in the first VXLAN packet that has been decapsulated by the first network device, storing, by the first network device, the second VXLAN packet in a memory.

2. The method according to claim 1, wherein the method further comprises:
determining, by the first network device, whether a third VXLAN packet is stored in the memory, wherein the third VXLAN packet is a VXLAN packet received by the first network device on the first link or the second link, the third VXLAN packet comprises a third sequence number and a third service packet, the third sequence number indicates a location of the third service packet in the plurality of service packets, and the third service packet is the next service packet of the first service packet in the first VXLAN packet that has been decapsulated by the first network device; and
when the first network device determines that the third VXLAN packet is stored in the memory, decapsulating, by the first network device, the third VXLAN packet.

3. The method according to claim 1, wherein the method further comprises:
when residence time of a fourth VXLAN packet in the memory is greater than or equal to a first time threshold, determining, by the first network device, whether a value of a fourth sequence number is less than a value of a sequence number comprised in another VXLAN packet stored in the memory, and determining, by the first network device, whether the value of the fourth sequence number is greater than a value of the first sequence number in the first VXLAN packet that has been decapsulated by the first network device, wherein the fourth VXLAN packet is a VXLAN packet received by the first network device on the first link or the second link, the fourth VXLAN packet comprises the fourth sequence number and a fourth service packet, and the fourth sequence number indicates a location of the fourth service packet in the plurality of service packets; and
when the first network device determines that the value of the fourth sequence number is less than the value of the sequence number comprised in the another VXLAN packet stored in the memory, and the value of the fourth sequence number is greater than the value of the first sequence number in the first VXLAN packet that has been decapsulated by the first network device, decapsulating, by the first network device, the fourth VXLAN packet.

4. The method according to claim 1, wherein the method further comprises:
when residence time of a fourth VXLAN packet in the memory is greater than or equal to a first time threshold, determining, by the first network device, whether a value of a fourth sequence number is greater than a value of a sequence number comprised in another VXLAN packet stored in the memory, wherein the fourth VXLAN packet is a VXLAN packet received by the first network device on the first link or the second link, the fourth VXLAN packet comprises the fourth sequence number and a fourth service packet, and the fourth sequence number indicates a location of the fourth service packet in the plurality of service packets; and
when the first network device determines that the value of the fourth sequence number is greater than the value of the sequence number comprised in the another VXLAN packet stored in the memory, resetting, by the first network device, the residence time of the fourth VXLAN packet in the memory, and re-counting the residence time of the fourth VXLAN packet in the memory.

5. The method according to claim 1, wherein the method further comprises:
when residence time of a fourth VXLAN packet in the memory is greater than or equal to a first time threshold, determining, by the first network device, whether a value of a fourth sequence number is less than a value of a sequence number comprised in another VXLAN packet stored in the memory, and determining, by the first network device, whether an absolute value of a difference between the value of the fourth sequence number and a value of the first sequence number in the first VXLAN packet that has been decapsulated by the first network device is greater than a first sequence number threshold, wherein the fourth VXLAN packet is a VXLAN packet received by the first network device on the first link or the second link, the fourth VXLAN packet comprises the fourth sequence number and a fourth service packet, the fourth sequence number indicates a location of the fourth service packet in the plurality of service packets, and a range of the first sequence number threshold is [0.5N, N], wherein N indicates an upper limit value of a sequence number in a VXLAN packet sent by the second network device; and when the first network device determines that the value of the fourth sequence number is less than the value of the sequence number comprised in the another VXLAN packet stored in the memory, and the absolute value of the difference between the value of the fourth sequence number and the value of the first sequence number in the first VXLAN packet that has been decapsulated by the first network device is greater than the first sequence number threshold, decapsulating, by the first network device, the fourth VXLAN packet.

6. The method according to claim 1, wherein the first VXLAN packet further comprises an identifier of a first data flow, and the first data flow comprises the plurality of service packets.

7. A first network device in a virtual extensible local area network (VXLAN), wherein the first network device comprises:

a receiver, configured to receive, on a first link, a first VXLAN packet sent by a second network device in the VXLAN, the first network device connected to the second network device through a VXLAN tunnel, and the VXLAN tunnel comprising the first link and a second link, wherein the first VXLAN packet comprises a first sequence number and a first service packet, and the first sequence number indicates a location of the first service packet in a plurality of service packets; and a processor, configured to decapsulate the first VXLAN packet; wherein the receiver is further configured to receive, on the second link, a second VXLAN packet sent by the second network device, wherein the second VXLAN packet comprises a second sequence number and a second service packet, and the second sequence number indicates a location of the second service packet in the plurality of service packets;

after the processor decapsulates the first VXLAN packet, the processor is further configured to determine whether the second service packet is a next service packet of the first service packet in the plurality of service packets;

when the processor determines that the second service packet is the next service packet of the first service packet, the processor is further configured to decapsulate the second VXLAN packet; and when the processor determines that the second service packet is not the next service packet of the first service packet in the first VXLAN packet that has been decapsulated by the processor, the processor is further configured to store the second VXLAN packet in a memory.

8. The first network device according to claim 7, wherein the processor is further configured to determine whether a third VXLAN packet is stored in the memory, wherein the third VXLAN packet is a VXLAN packet received by the receiver on the first link or the second link, the third VXLAN packet comprises a third sequence number and a third service packet, the third sequence number indicates a location of the third service packet in the plurality of service packets, and the third service packet is the next service packet of the first service packet in the first VXLAN packet that has been decapsulated by the processor; and when the processor determines that the third VXLAN packet is stored in the memory, the processor is further configured to decapsulate the third VXLAN packet.

9. The first network device according to claim 7, wherein when residence time of a fourth VXLAN packet in the memory is greater than or equal to a first time threshold, the processor is further configured to determine whether a value of a fourth sequence number is less than a value of a sequence number comprised in another VXLAN packet stored in the memory; and the processor is further configured to determine whether the value of the fourth sequence number is greater than a value of the first sequence number in the first VXLAN packet that has been decapsulated by the processor, wherein the fourth VXLAN packet is a VXLAN packet received by the receiver on the first link or the second link, the fourth VXLAN packet comprises the fourth sequence number and a fourth service packet, and the fourth sequence number indicates a location of the fourth service packet in the plurality of service packets; and when the processor determines that the value of the fourth sequence number is less than the value of the sequence number comprised in the another VXLAN packet stored in the memory, and the value of the fourth sequence number is greater than the value of the first sequence number in the first VXLAN packet that has been decapsulated by the processor, the processor is further configured to decapsulate the fourth VXLAN packet.

10. The first network device according to claim 7, wherein when residence time of a fourth VXLAN packet in the memory is greater than or equal to a first time threshold, the processor is further configured to determine whether a value of a fourth sequence number is greater than a value of a sequence number comprised in another VXLAN packet stored in the memory, wherein the fourth VXLAN packet is a VXLAN packet received by the receiver on the first link or the second link, the fourth VXLAN packet comprises the fourth sequence number and a fourth service packet, and the fourth sequence number indicates a location of the fourth service packet in the plurality of service packets; and when the processor determines that the value of the fourth sequence number is greater than the value of the sequence number comprised in the another VXLAN packet stored in the memory, the processor is further configured to: reset the residence time of the fourth VXLAN packet in the memory, and re-count the residence time of the fourth VXLAN packet in the memory.

11. The first network device according to claim 7, wherein when residence time of a fourth VXLAN packet in the memory is greater than or equal to a first time threshold, the processor is further configured to determine whether a value of a fourth sequence number is less than a value of a sequence number comprised in another VXLAN packet stored in the memory; and the processor is further configured to determine whether an absolute value of a difference between the value of the fourth sequence number and a value of the first sequence number in the first VXLAN packet that has been decapsulated by the processor is greater than a first sequence number threshold, wherein the fourth VXLAN packet is a VXLAN packet received by the receiver on the first link or the second link, the fourth VXLAN packet comprises the fourth sequence number and a fourth service packet, the fourth sequence number indicates a location of the fourth service packet in the plurality of service packets, and a range of the first sequence number threshold is [0.5N, N], wherein N indicates an upper limit value of a sequence number in a VXLAN packet sent by the second network device; and when the processor determines that the value of the fourth sequence number is less than the value of the sequence number comprised in the another VXLAN packet stored in the memory, and the absolute value of the difference between the value of the fourth sequence number and the value of the first sequence number in the first VXLAN packet that has been decapsulated by the processor is greater than the first sequence number threshold, the processor is further configured to decapsulate the fourth VXLAN packet.

12. The first network device according to claim 7, wherein the first VXLAN packet further comprises an identifier of a first data flow, and the first data flow comprises the plurality of service packets.

13. A second network device in a virtual extensible local area network (VXLAN), wherein the second network device comprises:
- a receiver, configured to receive a plurality of service packets from a virtual machine (VM), wherein the plurality of service packets comprise a first service packet and a second service packet;
- a processor, configured to generate a first VXLAN packet based on the first service packet, wherein the first VXLAN packet comprises a first sequence number and the first service packet, and the first sequence number indicates a location of the first service packet in the plurality of service packets; and
- a transmitter, configured to send the first VXLAN packet to a first network device in the VXLAN on a first link, the first network device connected to the second network device through a VXLAN tunnel, and the VXLAN tunnel comprising the first link and a second link; wherein the processor is further configured to generate a second VXLAN packet based on the second service packet, wherein the second VXLAN packet comprises a second sequence number and the second service packet, the second sequence number indicates a location of the second service packet in the plurality of service packets, and the second service packet is a next service packet of the first service packet, the second sequence number enabling the first network device to determine whether to decapsulate or to store the second VXLAN packet after decapsulation of the first VXLAN packet; and after the transmitter sends the first VXLAN packet to the first network device on the first link, the transmitter is further configured to send the second VXLAN packet to the first network device on the second link.

14. The second network device according to claim 13, wherein
the first VXLAN packet further comprises a VXLAN header, and the VXLAN header comprises the first sequence number.

15. The second network device according to claim 13, wherein
the first VXLAN packet further comprises a generic network virtualization encapsulation (GENEVE) header, the GENEVE header comprises a sequence number type-length-value (TLV), and the sequence number TLV comprises the first sequence number.

16. The second network device according to claim 13, wherein
the first VXLAN packet further comprises an identifier of a first data flow, and the first data flow comprises the plurality of service packets.

* * * * *